(12) United States Patent
Liang et al.

(10) Patent No.: US 9,858,649 B2
(45) Date of Patent: Jan. 2, 2018

(54) DEPTH-BASED IMAGE BLURRING

(71) Applicant: Lytro, Inc., Mountain View, CA (US)

(72) Inventors: Chia-Kai Liang, San Jose, CA (US);
Kent Oberheu, Berkeley, CA (US);
Kurt Akeley, Saratoga, CA (US);
Garrett Girod, Fremont, CA (US);
Nikhil Karnad, Mountain View, CA
(US); Francis A. Benevides, Jr.,
Portland, OR (US)

(73) Assignee: Lytro, Inc., Mountain View, CA (US)

( * ) Notice: Subject to any disclaimer, the term of this patent is extended or adjusted under 35 U.S.C. 154(b) by 160 days.

(21) Appl. No.: 14/871,533

(22) Filed: Sep. 30, 2015

(65) Prior Publication Data

US 2017/0091906 A1    Mar. 30, 2017

(51) Int. Cl.
*G06K 9/00* (2006.01)
*G06T 5/00* (2006.01)
*G06F 3/0484* (2013.01)

(52) U.S. Cl.
CPC .......... *G06T 5/002* (2013.01); *G06F 3/04842* (2013.01); *G06T 2207/10028* (2013.01)

(58) Field of Classification Search
CPC ............ G02B 27/0075; G02B 21/367; G02B 3/0056; G06T 5/50; G06T 2200/21; G06T 2200/24; G06T 2207/10052; G06T 2207/20092; G06T 2207/20104; G06T 5/007; G06T 7/11; G06T 7/194; G06T 7/557; G06K 9/00134
See application file for complete search history.

(56) References Cited

U.S. PATENT DOCUMENTS

| 4,661,986 A | 4/1987 | Adelson |
| 5,076,687 A | 12/1991 | Adelson |
| 5,748,371 A | 5/1998 | Cathey, Jr. et al. |
| (Continued) | | |

FOREIGN PATENT DOCUMENTS

WO    2011029209    3/2011

OTHER PUBLICATIONS

Agarwala, A., et al., "Interactive Digital Photomontage," ACM Transactions on Graphics, Proceedings of SIGGRAPH 2004, vol. 32, No. 3, 2004.

(Continued)

*Primary Examiner* — Bhavesh Mehta
*Assistant Examiner* — Ian Lemieux
(74) *Attorney, Agent, or Firm* — Raubvogel Law Office

(57) ABSTRACT

An image such as a light-field image may be processed to provide depth-based blurring. The image may be received in a data store. At an input device, first and second user input may be received to designate a first focus depth and a second focus depth different from the first focus depth, respectively. A processor may identify one or more foreground portions of the image that have one or more foreground portion depths, each of which is less than the first focus depth. The processor may also identify one or more background portions of the image that have one or more background portion depths, each of which is greater than the second focus depth. The processor may also apply blurring to the one or more foreground portions and the one or more background portions to generate a processed image, which may be displayed on a display device.

48 Claims, 31 Drawing Sheets

(56) References Cited

U.S. PATENT DOCUMENTS

| | | | |
|---|---|---|---|
| 6,034,690 | A | 3/2000 | Gallery et al. |
| 6,201,899 | B1 | 3/2001 | Bergen |
| 6,320,979 | B1 | 11/2001 | Melen |
| 6,785,667 | B2 | 8/2004 | Orbanes et al. |
| 7,945,653 | B2 | 5/2011 | Zuckerberg et al. |
| 8,155,478 | B2 | 4/2012 | Vitsnudel et al. |
| 8,559,705 | B2 | 10/2013 | Ng |
| 8,570,426 | B2 * | 10/2013 | Pitts .................. H04N 5/23212 348/345 |
| 8,749,620 | B1 | 6/2014 | Pitts et al. |
| 8,811,769 | B1 | 8/2014 | Pitts et al. |
| 8,831,377 | B2 | 9/2014 | Pitts et al. |
| 8,908,058 | B2 | 12/2014 | Akeley et al. |
| 8,948,545 | B2 | 2/2015 | Akeley et al. |
| 8,995,785 | B2 | 3/2015 | Knight et al. |
| 9,214,013 | B2 * | 12/2015 | Venkataraman ........ G06T 5/005 |
| 9,294,662 | B2 * | 3/2016 | Vondran, Jr. ............ G06T 5/002 |
| 2002/0015048 | A1 | 2/2002 | Nister |
| 2003/0103670 | A1 | 6/2003 | Schoelkopf et al. |
| 2004/0114176 | A1 | 6/2004 | Bodin et al. |
| 2006/0130017 | A1 | 6/2006 | Cohen et al. |
| 2007/0071316 | A1 | 3/2007 | Kubo |
| 2007/0188613 | A1 | 8/2007 | Nobori et al. |
| 2007/0269108 | A1 | 11/2007 | Steinberg et al. |
| 2010/0103311 | A1 * | 4/2010 | Makii ................ H04N 5/23293 348/369 |
| 2011/0018903 | A1 | 1/2011 | Lapstun et al. |
| 2012/0287329 | A1 * | 11/2012 | Yahata ..................... G06T 5/50 348/345 |
| 2013/0128087 | A1 * | 5/2013 | Georgiev ............. H04N 5/2254 348/307 |
| 2013/0215108 | A1 * | 8/2013 | McMahon ............. G06T 19/20 345/419 |
| 2013/0215226 | A1 | 8/2013 | Chauvier et al. |
| 2013/0342526 | A1 * | 12/2013 | Ng ....................... G06T 15/205 345/419 |
| 2014/0177905 | A1 * | 6/2014 | Grefalda .................. G06K 9/78 382/103 |
| 2014/0204111 | A1 | 7/2014 | Vaidyanathan et al. |
| 2014/0368494 | A1 * | 12/2014 | Sakharnykh ........... G06T 5/004 345/419 |
| 2015/0104101 | A1 | 4/2015 | Bryant et al. |
| 2015/0193937 | A1 * | 7/2015 | Georgiev ............. G06T 7/0065 382/168 |
| 2015/0279056 | A1 | 10/2015 | Akeley |
| 2016/0142615 | A1 * | 5/2016 | Liang ................. H04N 5/23212 348/222.1 |
| 2016/0353026 | A1 * | 12/2016 | Blonde ................. G06T 7/0002 |

OTHER PUBLICATIONS

Nguyen, Hubert. "Practical Post-Process Depth of Field." GPU Gems 3. Upper Saddle River, NJ: Addison-Wesley, 2008.

Shade, Jonathan, et al., "Layered Depth Images", SIGGRAPH 98, pp. 1-2.

* cited by examiner

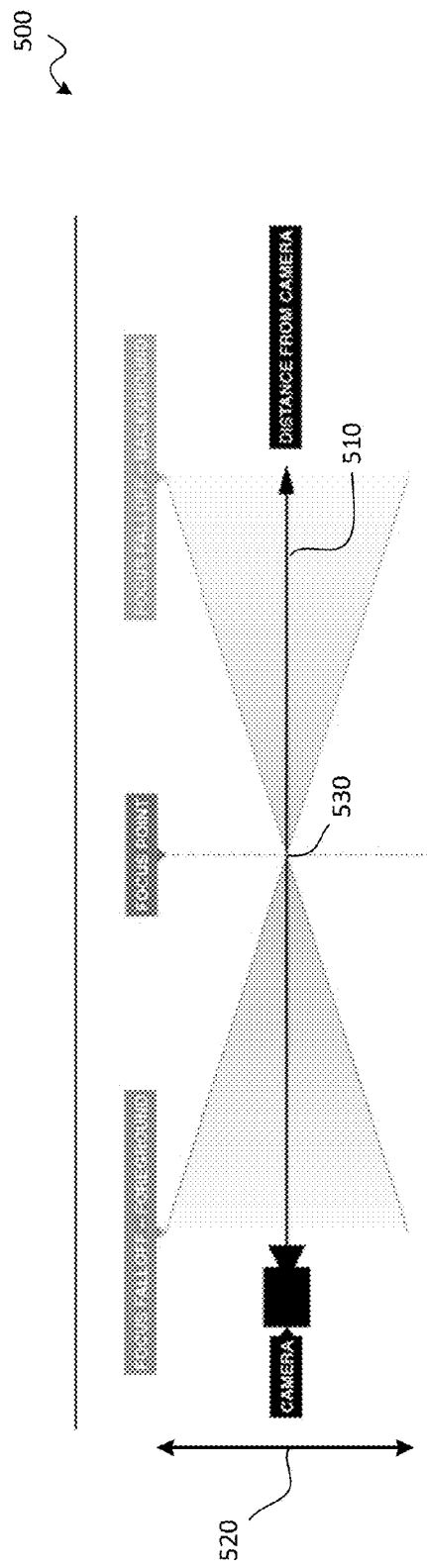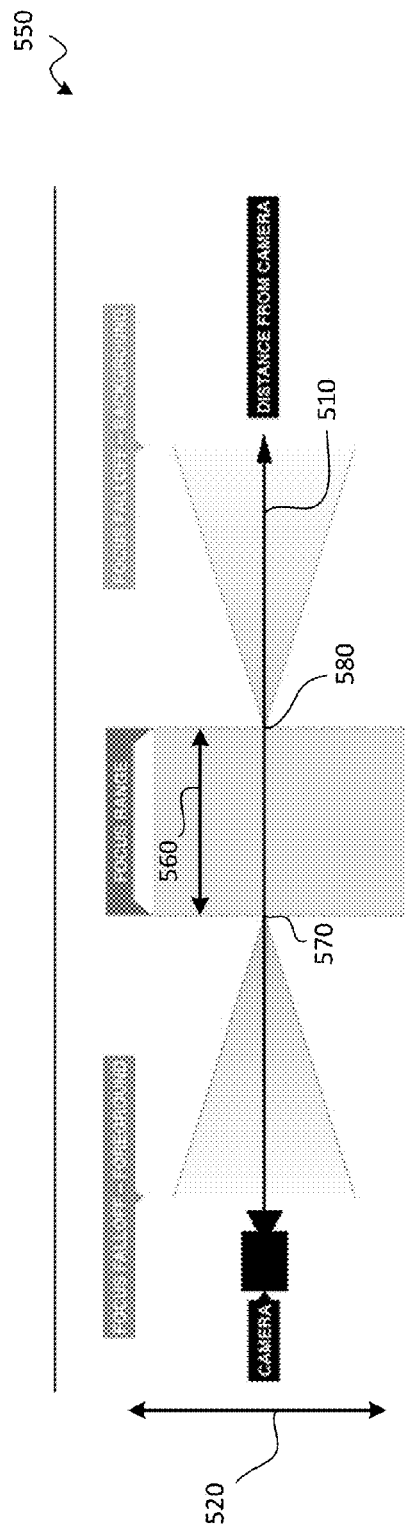
FIG. 5A
FIG. 5B

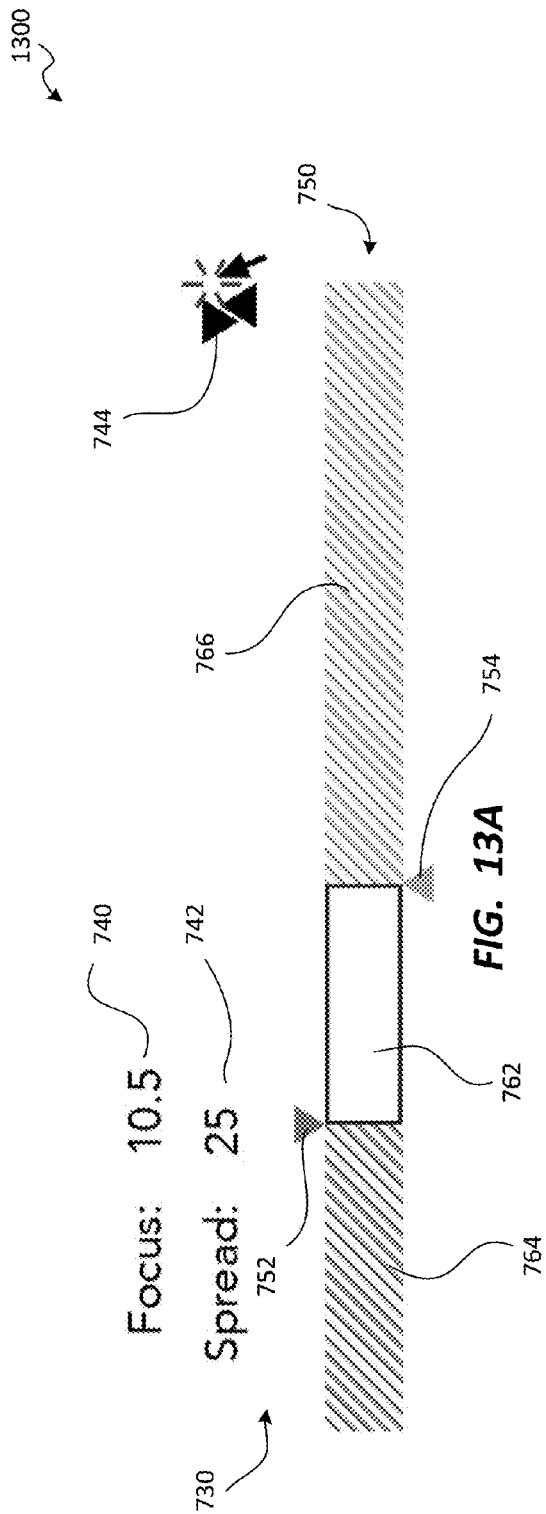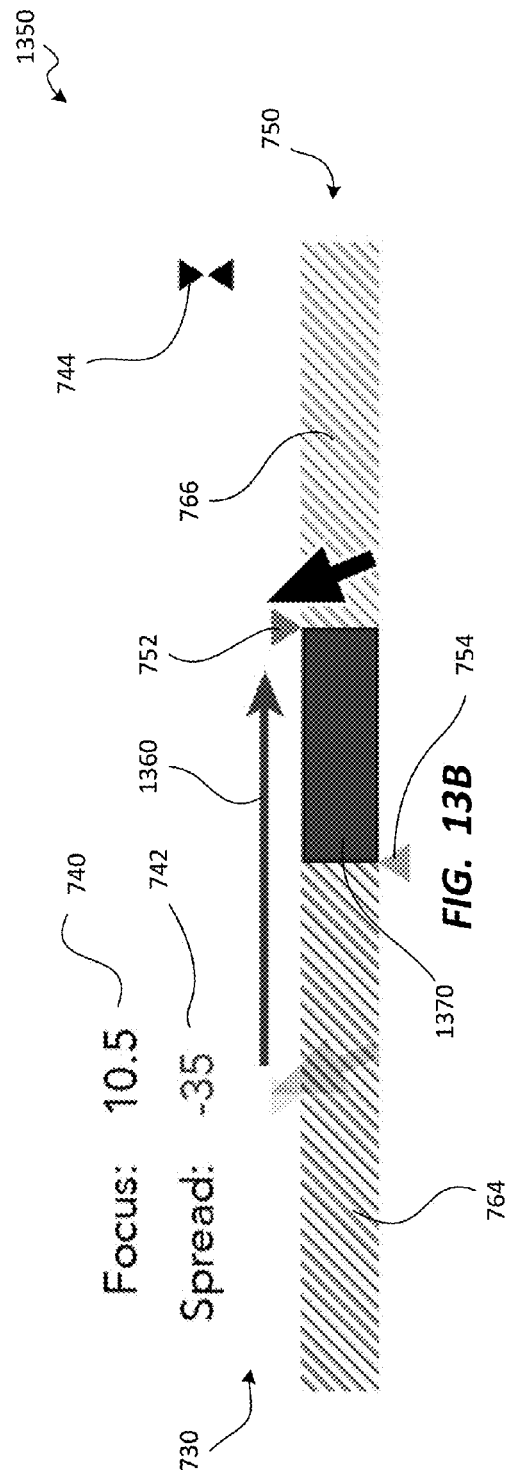

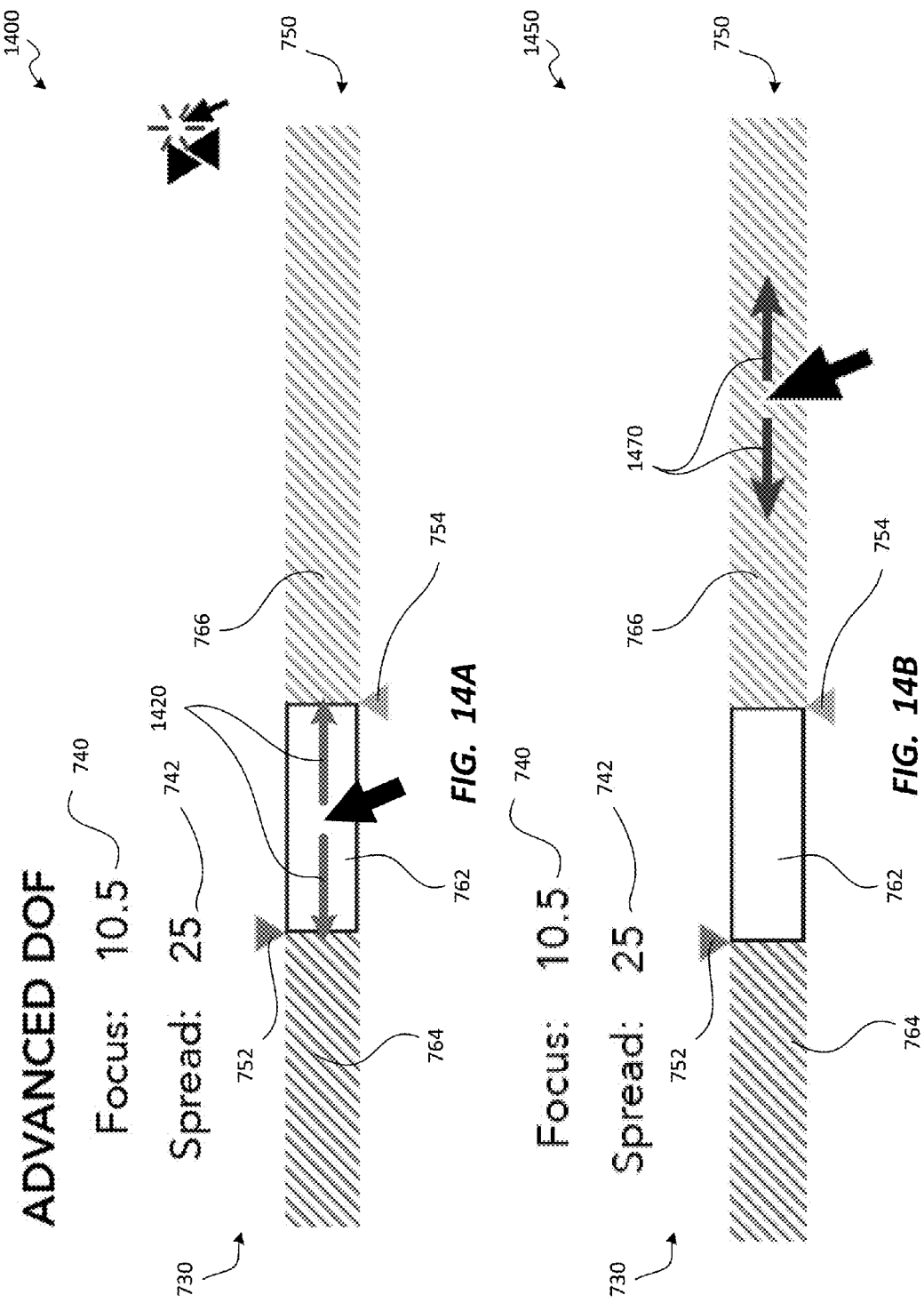

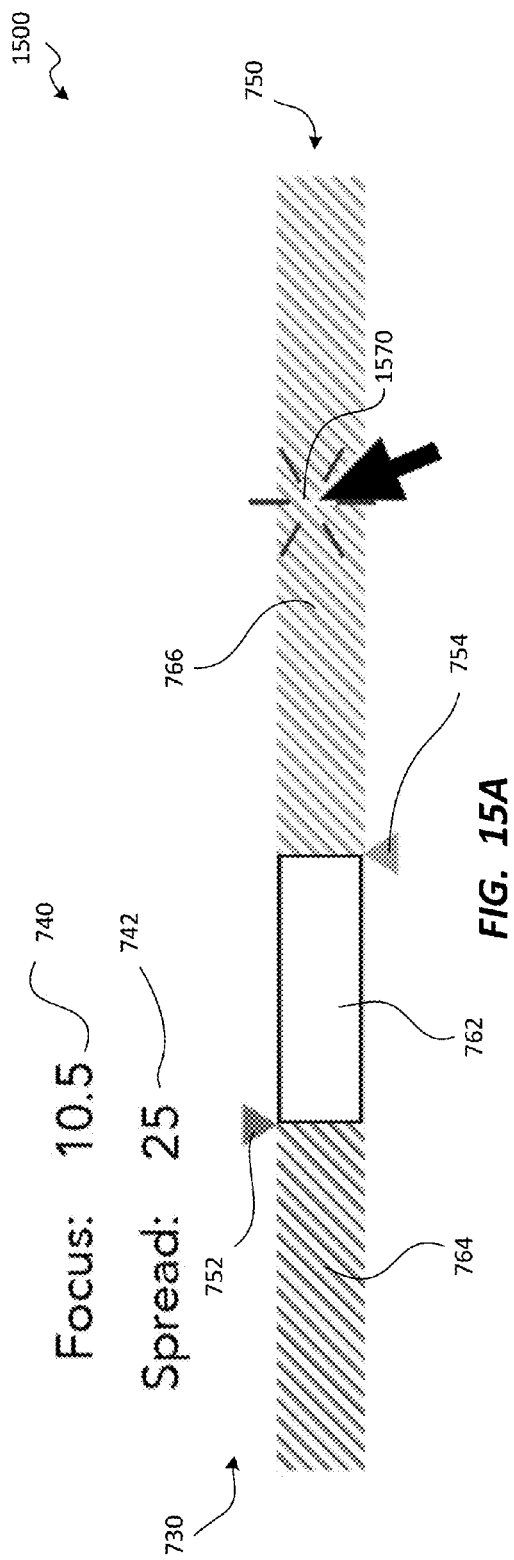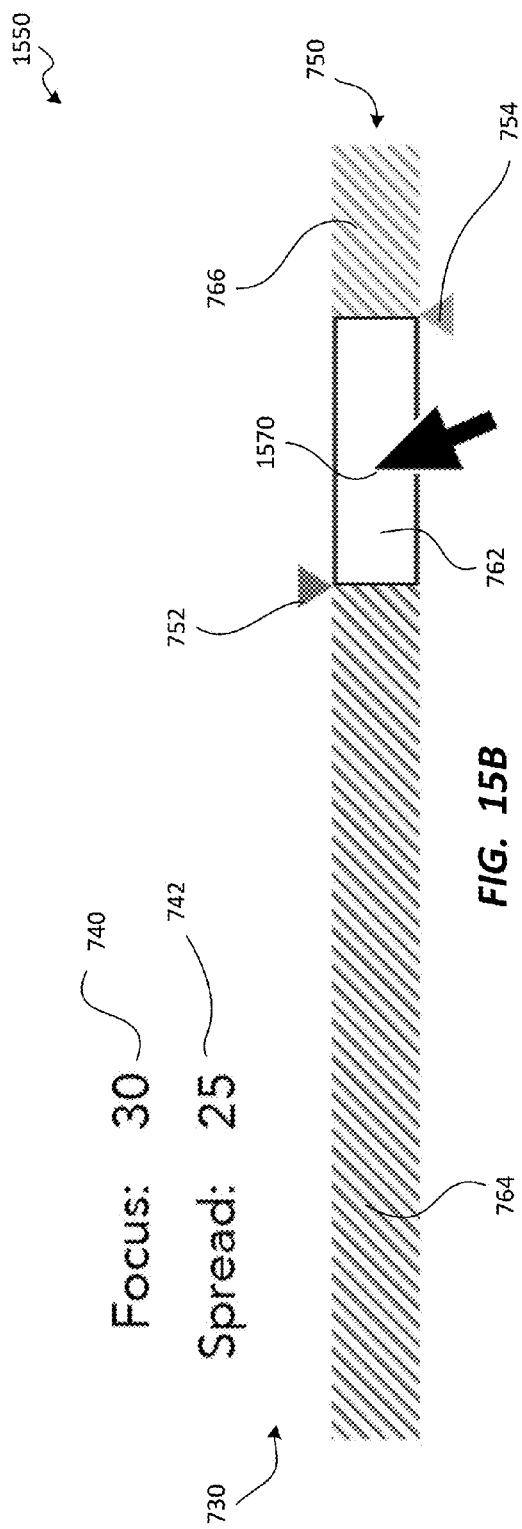

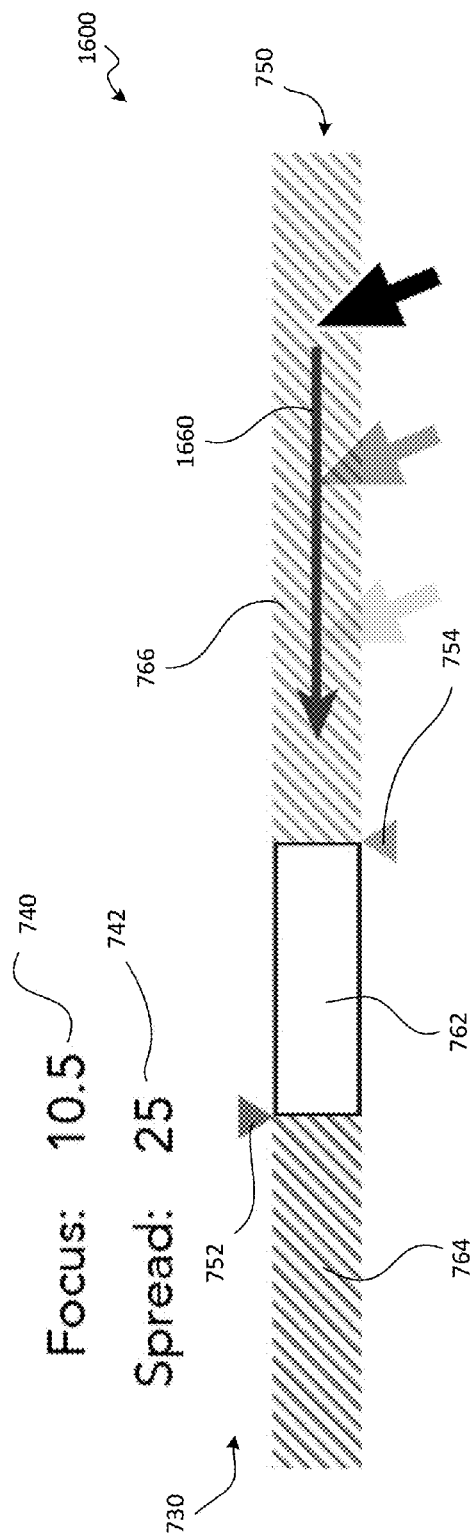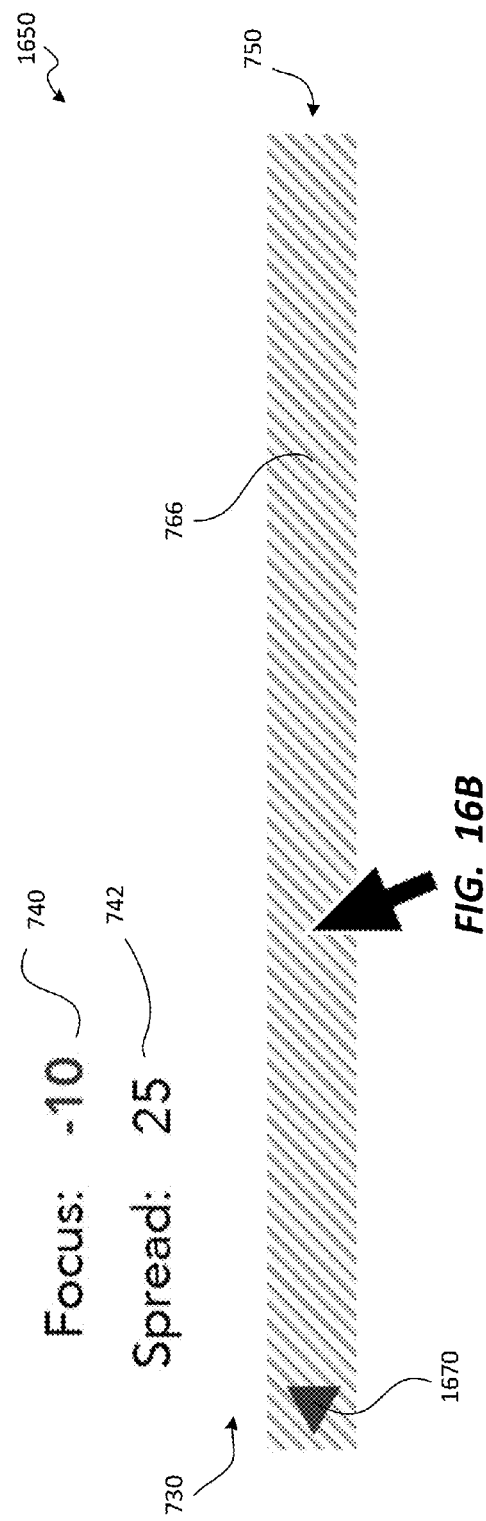

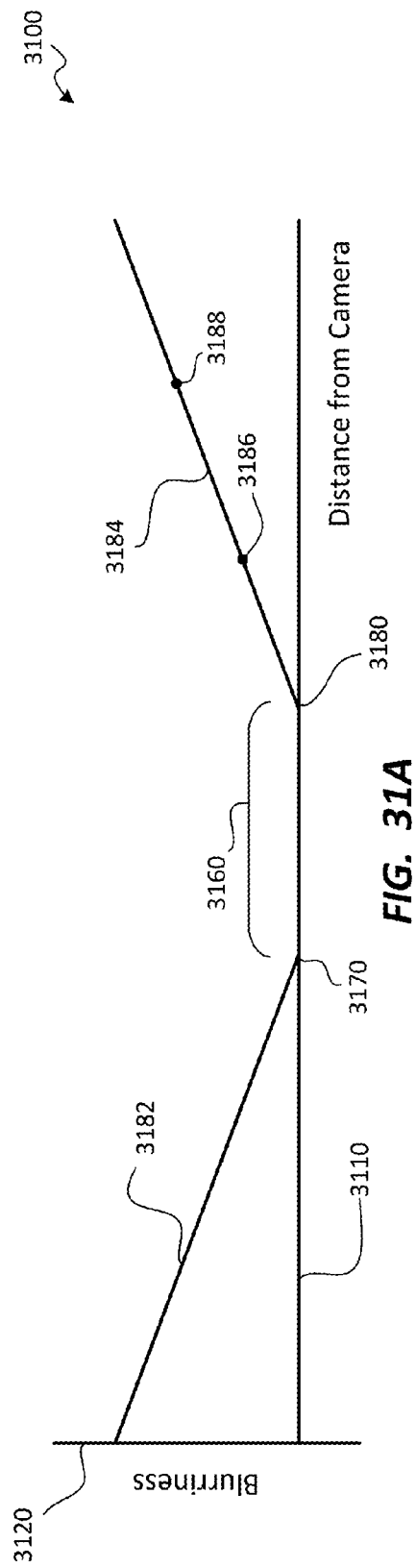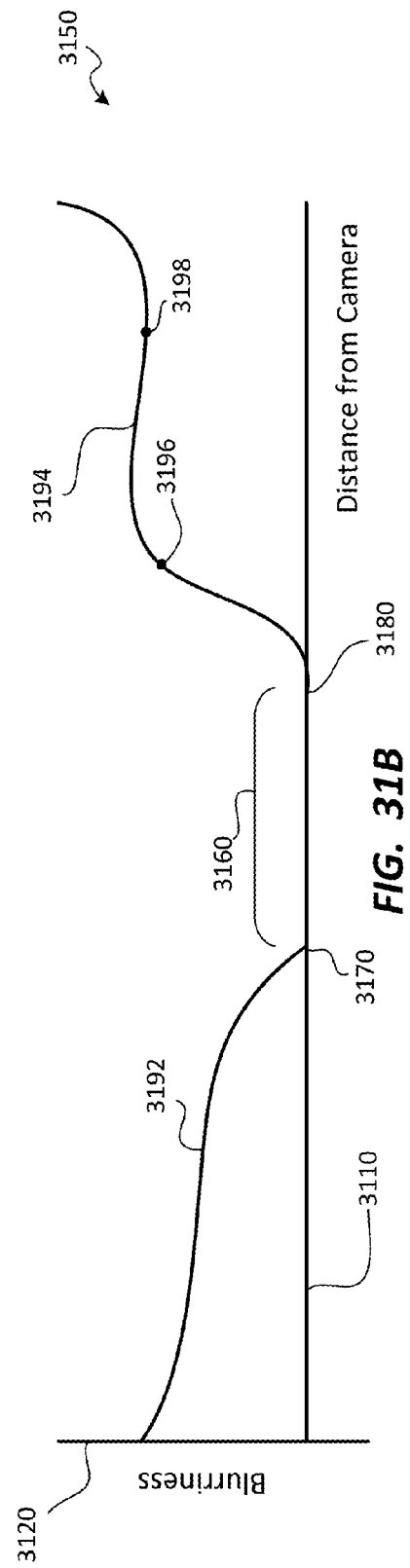

DEPTH-BASED IMAGE BLURRING

CROSS-REFERENCE TO RELATED APPLICATIONS

The present application is related to U.S. application Ser. No. 14/837,465 for "Depth-Based Application of Image Effects", filed Aug. 27, 2015, the disclosure of which is incorporated herein by reference in its entirety.

The present application is related to U.S. application Ser. No. 13/774,925 for "Compensating for Sensor Saturation and Microlens Modulation During Light-Field Image Processing", filed Feb. 22, 2013, the disclosure of which is incorporated herein by reference in its entirety.

The present application is related to U.S. Utility application Ser. No. 13/774,971 for "Compensating for Variation in Microlens Position During Light-Field Image Processing", filed on Feb. 22, 2013, issued on Sep. 9, 2014 as U.S. Pat. No. 8,831,377, the disclosure of which is incorporated herein by reference in its entirety.

The present application is related to U.S. Utility application Ser. No. 13/774,986 for "Light-Field Processing and Analysis, Camera Control, and User Interfaces and Interaction on Light-Field Capture Devices", filed on Feb. 22, 2013, issued on Mar. 31, 2015 as U.S. Pat. No. 8,995,785, the disclosure of which is incorporated herein by reference in its entirety.

The present application is related to U.S. Utility application Ser. No. 13/688,026 for "Extended Depth of Field and Variable Center of Perspective in Light-Field Processing", filed on Nov. 28, 2012, issued on Aug. 19, 2014 as U.S. Pat. No. 8,811,769, the disclosure of which is incorporated herein by reference in its entirety.

The present application is related to U.S. Utility application Ser. No. 11/948,901 for "Interactive Refocusing of Electronic Images," filed Nov. 30, 2007, issued on Oct. 15, 2013 as U.S. Pat. No. 8,559,705, the disclosure of which is incorporated herein by reference in its entirety.

The present application is related to U.S. Utility application Ser. No. 12/703,367 for "Light-field Camera Image, File and Configuration Data, and Method of Using, Storing and Communicating Same," filed Feb. 10, 2010, now abandoned, the disclosure of which is incorporated herein by reference in its entirety.

The present application is related to U.S. Utility application Ser. No. 13/027,946 for "3D Light-field Cameras, Images and Files, and Methods of Using, Operating, Processing and Viewing Same", filed on Feb. 15, 2011, issued on Jun. 10, 2014 as U.S. Pat. No. 8,749,620, the disclosure of which is incorporated herein by reference in its entirety.

The present application is related to U.S. Utility application Ser. No. 13/155,882 for "Storage and Transmission of Pictures Including Multiple Frames," filed Jun. 8, 2011, issued on Dec. 9, 2014 as U.S. Pat. No. 8,908,058, the disclosure of which is incorporated herein by reference in its entirety.

The present application is related to U.S. Utility application Ser. No. 13/533,319 for "Depth-Assigned Content for Depth-Enhanced Pictures," filed Jun. 26, 2012, the disclosure of which is incorporated herein by reference in its entirety.

TECHNICAL FIELD

The present disclosure relates to systems and methods for processing and displaying image data, and more specifically, to systems and methods for implementing depth-based effects such as blurring of images such as light-field images.

BACKGROUND

In conventional photography, the camera must typically be focused at the time the photograph is taken. The resulting image may have only color data for each pixel; accordingly, any object that was not in focus when the photograph was taken cannot be brought into sharper focus because the necessary data does not reside in the image.

By contrast, light-field images typically encode additional data for each pixel related to the trajectory of light rays incident to that pixel when the light-field image was taken. This data can be used to manipulate the light-field image through the use of a wide variety of rendering techniques that are not possible to perform with a conventional photograph. In some implementations, a light-field image may be refocused and/or altered to simulate a change in the center of perspective (CoP) of the camera that received the image. Further, a light-field image may be used to generate an enhanced depth-of-field (EDOF) image in which all parts of the image are in focus. A depth map can typically be obtained from a light-field image, indicating the depth at which objects in the light-field image were disposed, relative to the light-field camera, at the time the light-field image was captured.

Existing techniques for processing conventional images are limited in many respects. Specifically, editing conventional images to provide effects, such as changing colorization, contrast, or objects in the image, can be challenging. Typically, the user must employ careful selection of object boundaries to control how the effects are applied. Accordingly, application of effects in conventional images can be a time-consuming and labor-intensive effort. Existing processing and effect application techniques for light-field images often do not make full use of the information in the light-field image, or utilize a user interface that makes it difficult for the user to locate and apply the desired effect.

SUMMARY

According to various embodiments, the system and method described herein facilitate customization of image properties such as depth of field. The customized depth of field may be used to control various image processes, such as blurring and/or bokeh effects in foreground and/or background portions of the image. When applied to an image accompanied by sufficient depth information, the system and method may enable the user to easily designate depth levels within an image, such as background, subject, and foreground levels, based on depth and without the need to manually select the corresponding image portion(s).

An image such as a light-field image may be captured with a light-field image capture device with a microlens array. The image may be received in a data store along with a depth map that indicates depths at which objects in the image are disposed, relative to the camera, at the time of image capture. At an input device, first and second user input may be received to designate a first focus depth and a second focus depth different from the first focus depth, respectively. The first focus depth may indicate the far limit (i.e., maximum depth) of an image foreground, and the second focus depth may indicate the near limit (i.e., the minimum depth) of an image background.

A processor may use the first focus depth to identify the image foreground. The image foreground may have one or more foreground portions that have one or more foreground portion depths, each of which is less than the first focus depth. Similarly, the processor may also use the second focus depth to identify the image background. The image background may have one or more background portions that have one or more background portion depths, each of which is greater than the second focus depth.

Once the image foreground and the image background have been identified, the processor may apply blurring and/or other effects to the one or more foreground portions and/or the one or more background portions to generate a processed image. The processed image may have, for example, an image subject including one or more subject portions that have one or more subject portion depths, each of which is between the first focus depth and the second focus depth. The image subject may optionally be in focus, and blurring may be applied to the image foreground and the image background in proportion to the difference in depth between each foreground portion and each background portion from the subject portion. Thus, a foreground portion with a depth that is much smaller, relative to the image subject, may have more blurring applied to it than a foreground portion with a depth that is nearly as large as the first focus depth. Similarly, a background portion with a depth that is much greater, relative to the image subject, may have more blurring applied to it than a background portion with a depth that is only just larger than the second focus depth.

The processed image may be displayed on a display device. The user may make further adjustments, such as adjusting the first focus depth and/or the second focus depth again, until the desired effect is obtained. Various user interface elements, controls, and the like may be provided to the user to facilitate determination of the first and second focus depths and/or control application of depth-based effects such as blurring. In addition to or in the alternative to application of blurring, the designated first and second focus depths may be used to control application of bokeh effects such as the application of blur effects, which may be circular, noncircular, and/or variable with depth. Further, the blurring and bokeh effects are merely exemplary; the system and method disclosed herein may be used to apply a wide variety of other effects besides blurring and bokeh effects. Such effects may include, but are not limited to, modification of exposure, contrast, saturation, and/or colorization of the image, replacement of a portion of an image with another image or portion thereof, and/or the like. Hence, it will be understood that reference to application of "blurring" in this disclosure is also disclosure of any other depth-based effect.

Application of blurring, bokeh effects, and/or other effects may be varied linearly with depth and/or nonlinearly with depth, as desired. Additionally or alternatively, application of such effects may be varied linearly and/or nonlinearly based on the X coordinate and/or the Y coordinate of the pixel to be blurred. Thus, blurring maybe applied with greater intensity toward the top, bottom, center, and/or edges of an image.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

FIGS. 5A and 5B are graphs indicating traditional and range-limited methods, respectively, of processing an image based on depth of field.

FIGS. 13A and 13B are screenshot diagrams depicting the focus spread toolbox of the user interface of FIG. 7, in a positive-only spread mode and a negative spread mode, respectively, according to one embodiment.

FIGS. 14A and 14B are screenshot diagrams depicting the focus spread toolbox of the user interface of FIG. 7, illustrating movement of the entire focus slider, according to one embodiment.

FIGS. 15A and 15B are screenshot diagrams depicting the focus spread toolbox of the user interface of FIG. 7, before and after clicking on the focus slider, according to one embodiment.

FIGS. 16A and 16B are screenshot diagrams depicting the focus spread toolbox of the user interface of FIG. 7, before and after clicking and dragging the focus slider to move both the first focus distance and the second focus distance off of the focus slider, respectively, according to one embodiment.

FIGS. 31A and 31B are graphs illustrating linear and nonlinear application of blur effects, respectively, according to exemplary embodiments.

DEFINITIONS

Figure 1:
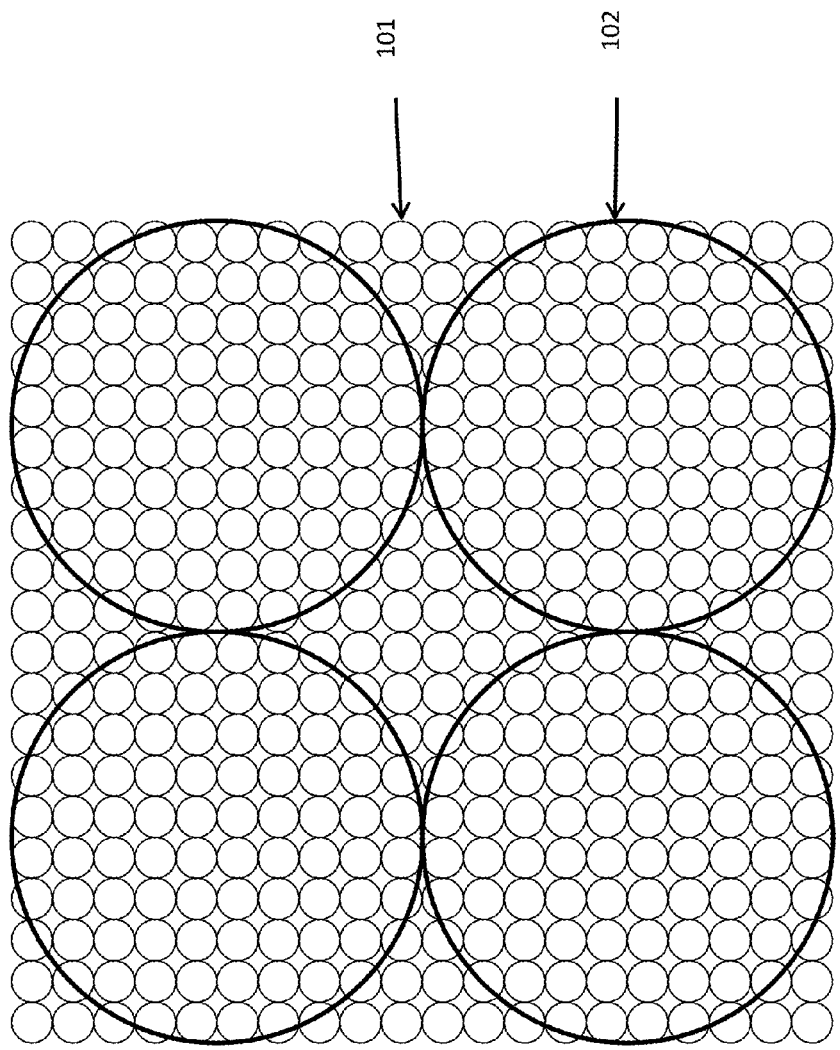
FIG. 1 depicts a portion of a light-field image.

For purposes of the description provided herein, the following definitions are used:

Background portion: a portion of an image in which one or more objects are further from the camera, relative to one or more other portions of the image.

Bokeh effects: effects that can be applied to one or more out-of-focus areas of an image.

Depth: a representation of distance between an object and/or corresponding image sample and a microlens array of a camera.

Depth map: a two-dimensional map corresponding to a light-field image, indicating a depth for each of multiple pixel samples within the light-field image.

Disk: a region in a light-field image that is illuminated by light passing through a single microlens; may be circular or any other suitable shape.

Extended depth of field (EDOF) image: an image that has been processed to have objects in focus along a greater depth range.

Gradual transition: a transition in application of an effect to an image that provides for partial application of the effect to at least a portion of the image, with no discontinuity between affected, partially-affected, and unaffected areas, as applicable.

Focus depth: a depth within an image on which a depth-based process is to be based.

Foreground portion: a portion of an image in which one or more objects are closer to the camera, relative to one or more other portions of the image.

Function: a mathematical relationship that provides one or more outputs for each set of one or more inputs.

Image: a two-dimensional array of pixel values, or pixels, each specifying a color.

Light-field data: data indicative of the intensity and origin of light received within a system such as a light-field camera.

Light-field image: an image that contains a representation of light-field data captured at the sensor.

Linear function: a function represented by a straight line.

Mask: a description of the degree to which an effect is to be applied to an image; may be (but need not be) a pictorial grayscale overlay of the image.

Microlens: a small lens, typically one in an array of similar microlenses.

Nonlinear function: a function that is not represented by a straight line.

Processed light-field image: the resulting image after one or more processing steps are applied to a light-field image.

Subject portion: a portion of an image that is to be featured in the image; typically (but not necessarily) to be in focus.

Tilt: the rotation of a focus plane such that the focus plane is not at a uniform depth, relative to the camera.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several techniques and methods for processing light-field images are described. One skilled in the art will recognize that these various techniques and methods can be performed singly and/or in any suitable combination with one another.

Architecture

Figure 2:
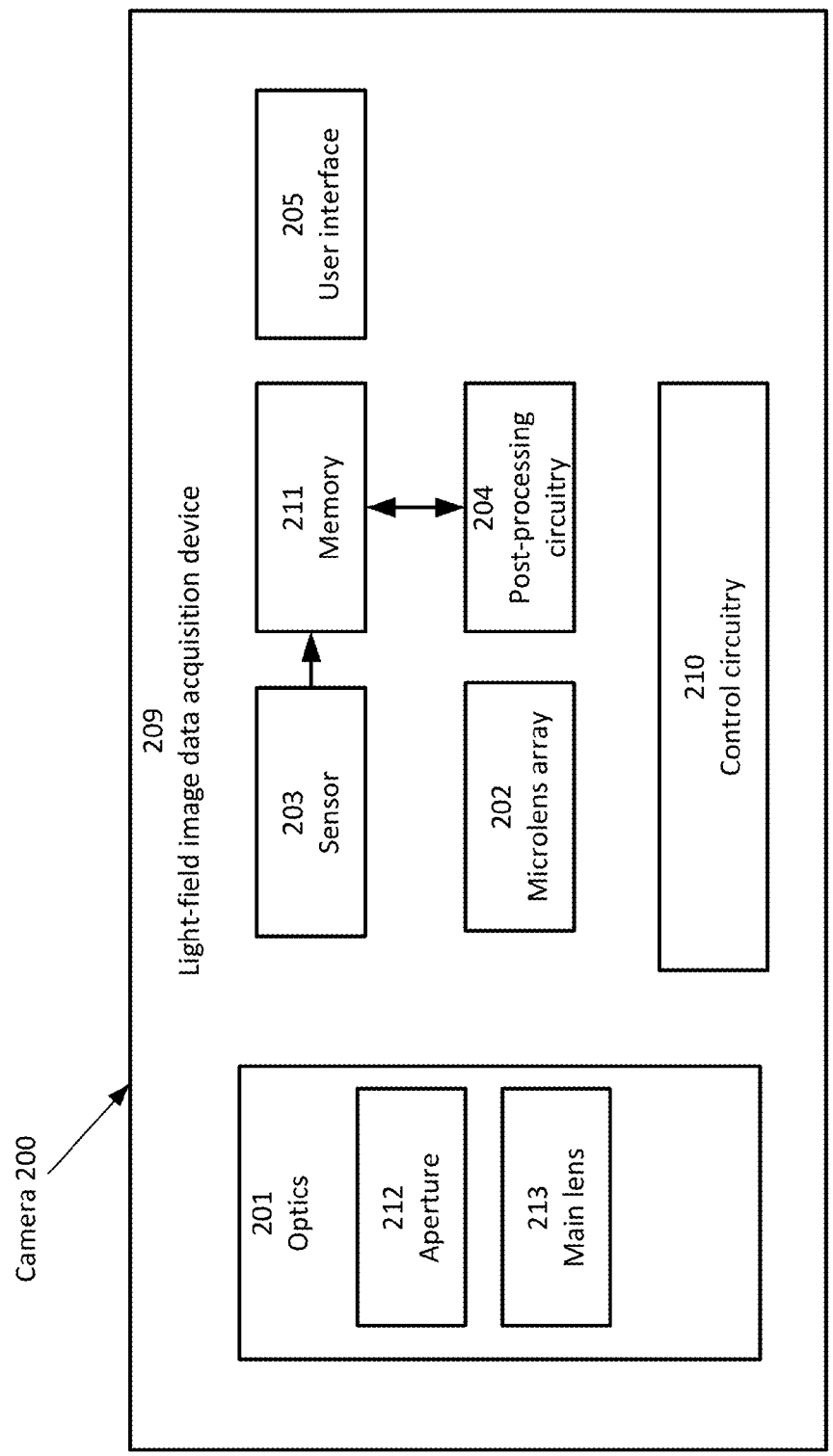
FIG. 2 depicts an example of an architecture for implementing the methods of the present disclosure in a light-field capture device, according to one embodiment.
Figure 3:
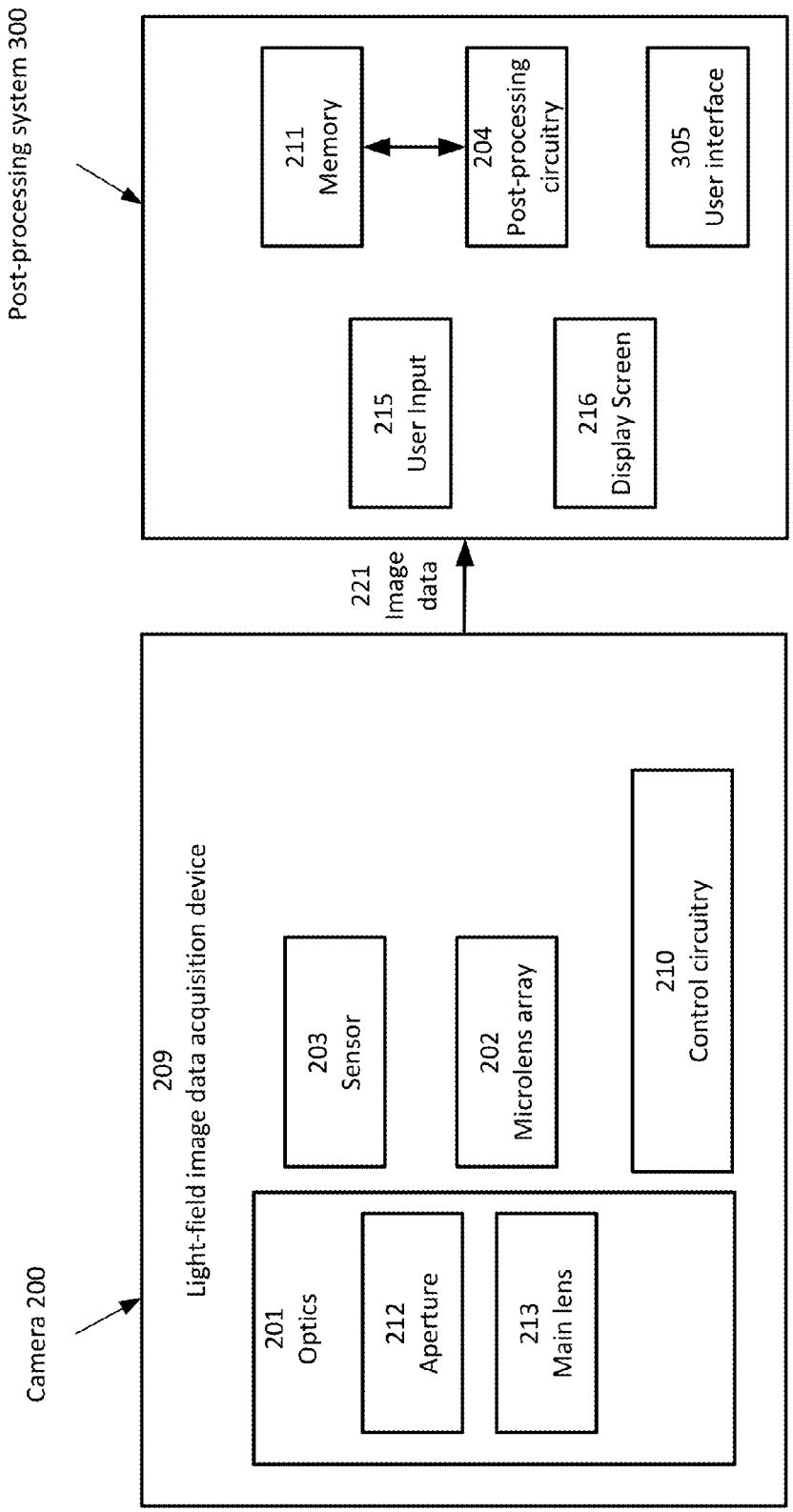
FIG. 3 depicts an example of an architecture for implementing the methods of the present disclosure in a post-processing system communicatively coupled to a light-field capture device, according to one embodiment.

In at least one embodiment, the system and method described herein can be implemented in connection with light-field images captured by light-field capture devices including but not limited to those described in Ng et al., Light-field photography with a hand-held plenoptic capture device, Technical Report CSTR 2005-02, Stanford Computer Science. Referring now to FIG. 2, there is shown a block diagram depicting an architecture for implementing the method of the present disclosure in a light-field capture device such as a camera 200. Referring now also to FIG. 3, there is shown a block diagram depicting an architecture for implementing the method of the present disclosure in a post-processing system 300 communicatively coupled to a light-field capture device such as a camera 200, according to one embodiment. One skilled in the art will recognize that the particular configurations shown in FIGS. 2 and 3 are merely exemplary, and that other architectures are possible for camera 200. One skilled in the art will further recognize that several of the components shown in the configurations of FIGS. 2 and 3 are optional, and may be omitted or reconfigured.

Figure 4:
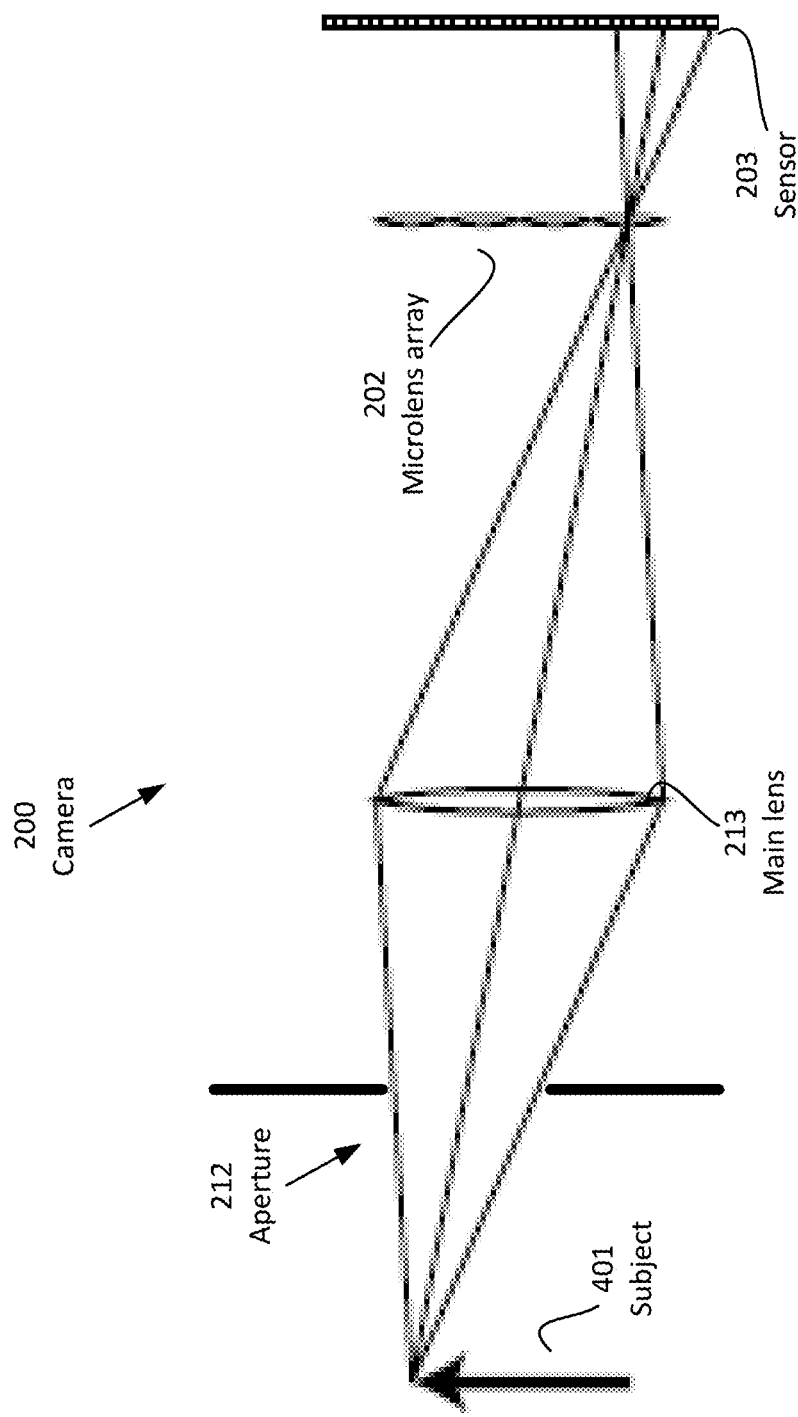
FIG. 4 depicts an example of an architecture for a light-field camera for implementing the methods of the present disclosure according to one embodiment.

In at least one embodiment, camera 200 may be a light-field camera that includes light-field image data acquisition device 209 having optics 201, image sensor 203 (including a plurality of individual sensors for capturing pixels), and microlens array 202. Optics 201 may include, for example, aperture 212 for allowing a selectable amount of light into camera 200, and main lens 213 for focusing light toward microlens array 202. In at least one embodiment, microlens array 202 may be disposed and/or incorporated in the optical path of camera 200 (between main lens 213 and sensor 203) so as to facilitate acquisition, capture, sampling of, recording, and/or obtaining light-field image data via sensor 203. Referring now also to FIG. 4, there is shown an example of an architecture for a light-field camera 200 for implementing the method of the present disclosure according to one embodiment. The Figure is not shown to scale. FIG. 4 shows, in conceptual form, the relationship between aperture 212, main lens 213, microlens array 202, and sensor 203, as such components interact to capture light-field data for subject 401.

In at least one embodiment, light-field camera 200 may also include a user interface 205 for allowing a user to provide input for controlling the operation of camera 200 for capturing, acquiring, storing, and/or processing image data.

Similarly, in at least one embodiment, post-processing system 300 may include a user interface 305 that allows the user to provide input to control and/or activate depth-based image processing, as set forth in this disclosure. The user interface 305 may facilitate the receipt of user input from the user to establish one or more parameters of the image processing process.

In at least one embodiment, light-field camera 200 may also include control circuitry 210 for facilitating acquisition, sampling, recording, and/or obtaining light-field image data. For example, control circuitry 210 may manage and/or control (automatically or in response to user input) the acquisition timing, rate of acquisition, sampling, capturing, recording, and/or obtaining of light-field image data.

In at least one embodiment, camera 200 may include memory 211 for storing image data, such as output by image sensor 203. Such memory 211 can include external and/or internal memory. In at least one embodiment, memory 211 can be provided at a separate device and/or location from camera 200, such as the post-processing system 300.

For example, camera 200 and/or the post-processing system 300 may store raw light-field image data, as output by sensor 203, and/or a representation thereof, such as a compressed image data file. In addition, as described in related U.S. Utility application Ser. No. 12/703,367 for "Light-field Camera Image, File and Configuration Data, and Method of Using, Storing and Communicating Same," filed Feb. 10, 2010, memory 211 can also store data representing the characteristics, parameters, and/or configurations (collectively "configuration data") of device 209.

In at least one embodiment, captured image data is provided to post-processing circuitry 204. Such circuitry 204 may be disposed in or integrated into light-field image data acquisition device 209, as shown in FIG. 2, or it may be in a separate component external to light-field image data acquisition device 209, such as the post-processing system 300 of FIG. 3. Such separate component may be local or remote with respect to light-field image data acquisition device 209. Any suitable wired or wireless protocol can be used for transmitting image data 221 to circuitry 204; for example camera 200 can transmit image data 221 and/or other data via the Internet, a cellular data network, a WiFi network, a Bluetooth communication protocol, and/or any other suitable means.

The post-processing system 300 may include any of a wide variety of computing devices, including but not limited to computers, smartphones, tablets, cameras, and/or any other device that processes digital information. The post-processing system 300 may include additional features such as a user input 215 and/or a display screen 216. If desired, light-field image data may be displayed for the user on the display screen 216.

Overview

Light-field images often include a plurality of projections (which may be circular or of other shapes) of aperture 212 of camera 200, each projection taken from a different vantage point on the camera's focal plane. The light-field image may be captured on sensor 203. The interposition of microlens array 202 between main lens 213 and sensor 203 causes images of aperture 212 to be formed on sensor 203, each microlens in microlens array 202 projecting a small image of main-lens aperture 212 onto sensor 203. These aperture-shaped projections are referred to herein as disks, although they need not be circular in shape. The term "disk" is not intended to be limited to a circular region, but can refer to a region of any shape.

Light-field images include four dimensions of information describing light rays impinging on the focal plane of camera 200 (or other capture device). Two spatial dimensions (herein referred to as x and y) are represented by the disks themselves. For example, the spatial resolution of a light-field image with 120,000 disks, arranged in a Cartesian pattern 400 wide and 300 high, is 400×300. Two angular dimensions (herein referred to as u and v) are represented as the pixels within an individual disk. For example, the angular resolution of a light-field image with 100 pixels within each disk, arranged as a 10×10 Cartesian pattern, is 10×10. This light-field image has a 4-D (x,y,u,v) resolution of (400,300,10,10). Referring now to FIG. 1, there is shown an example of a 2-disk by 2-disk portion of such a light-field image, including depictions of disks 102 and individual pixels 101; for illustrative purposes, each disk 102 is ten pixels 101 across.

In at least one embodiment, the 4-D light-field representation may be reduced to a 2-D image through a process of projection and reconstruction. As described in more detail in related U.S. Utility application Ser. No. 13/774,971 for "Compensating for Variation in Microlens Position During Light-Field Image Processing," filed Feb. 22, 2013, the disclosure of which is incorporated herein by reference in its entirety, a virtual surface of projection may be introduced, and the intersections of representative rays with the virtual surface can be computed. The color of each representative ray may be taken to be equal to the color of its corresponding pixel.

Any number of image processing techniques can be used to reduce color artifacts, reduce projection artifacts, increase dynamic range, and/or otherwise improve image quality. In particular, enhanced depth-of-field (EDOF) images may be created, in which all parts of the image are in focus. However, in many instances the user may wish to fine tune the depth of field of the image to keep one or more portions of the image in focus. For example, the user may wish to designate an image subject that is to be in focus, while an image background and/or an image foreground are blurred. Such image processing may be facilitated by the system and method provided herein.

Depth-Based Image Processing

The system and method of the present disclosure may facilitate user control over which portions of the image are in focus, and which are blurred. Further, the system and method of the present disclosure may facilitate user control over the application of other effects besides blurring, which include but are not limited to modification of exposure, contrast, saturation, and/or colorization of the image, replacement of a portion of an image with another image or portion thereof, and/or the like. Further, the user may have greater control over the manner in which blurring is applied. This will be conceptually illustrated in connection with FIGS. 5A and 5B.

FIGS. 5A and 5B are graphs 500, 550 indicating traditional and range-limited methods, respectively, of processing an image based on depth of field. Each of the graphs 500, 550 may have a horizontal axis 510 that represents the distance of objects in the image from the camera, and a vertical axis 520 that represents the blurriness of those objects.

The graph 500 of FIG. 5A illustrates traditional processing, which is the default condition for conventional imaging without the benefit of light-field image capture technology. The image may have a focus point 530 at which objects are in focus. At distances from the camera shorter than that of the focus point 530, blurriness may increase with decreased distance. Similarly, at distances from the camera greater than that of the focus point 530, blurriness may increase with increased distance.

The graph 550 of FIG. 5B illustrates processing that may be carried out according to the system and method presented herein. In place of the focus point 530, the image of FIG. 5B may have a focus range 560, within which all objects are in focus. The focus range 560 may extend from a first focus depth 570 to a second focus depth 580. At distances from the camera shorter than that of the first focus depth 570, blurriness may increase with decreased distance. Similarly, at distances from the camera greater than that of the second focus depth 580, blurriness may increase with increased distance.

The system and method presented herein may advantageously provide the user with the ability to determine which portion of the image is in focus by designating the first focus depth 570 and the second focus depth 580. Further, if desired, the user may designate the manner in which blur is applied to the foreground and/or background portions of the image. One exemplary method will be shown and described in connection with FIG. 6, and then illustrated in connection with the screenshot diagrams of FIG. 7 through FIG. 12.

Figure 6:
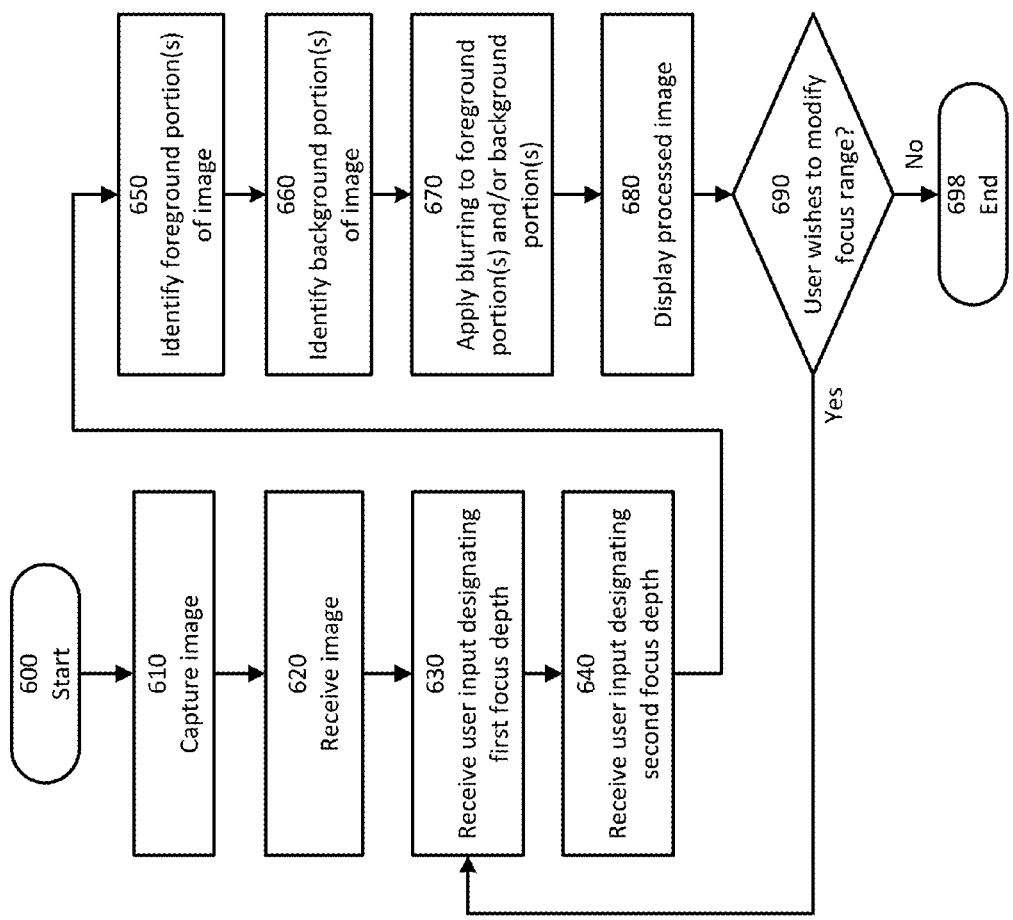
FIG. 6 is a flow diagram depicting a method of carrying out depth-based blurring of an image, according to one embodiment.

FIG. 6 is a flow diagram depicting a method of carrying out depth-based blurring of an image, according to one embodiment. The method may be performed with any image for which depth information is available. Thus, the method of FIG. 6 may be used in connection with stereoscopic, multi-scopic, and light-field images, or even with conventional images for which depth information has been obtained (for example, through depth measurements made with other instruments at the time of image capture, through the manual entry of depth information by the user, or the like). The following description is based on the example of processing a light-field image, but those of skill in the art will recognize how the method of FIG. 6 may be adapted for use with other image types.

The method may be performed, for example, with circuitry such as the post-processing circuitry 204 of the camera 200 of FIG. 2 or the post-processing circuitry 204 of the post-processing system 300 of FIG. 3, which is independent of the camera 200. In some embodiments, a computing device may carry out the method; such a computing device may include one or more of desktop computers, laptop computers, smartphones, tablets, cameras, and/or other devices that process digital information.

The method may start 600 with a step 610 in which the image (for example, a light-field image) is captured, for example, by the sensor 203 of the camera 200. In a step 620, the image may be received in a computing device, which may be the camera 200 as in FIG. 2. Alternatively, the computing device may be separate from the camera 200 as in the post-processing system 300 of FIG. 3, and may be any type of computing device, including but not limited to desktop computers, laptop computers, smartphones, tablets, and the like.

In a step 630, user input may be received (for example, in the camera 200 and/or the post-processing system 300) to designate the first focus depth 570. This designation may be made in a variety of ways, including but not limited to text entry, speech, selection from a menu, clicking or tapping on an indicator such as a slider, selecting a portion of the image, and/or the like.

In a step 640, user input may be received (for example, in the camera 200 and/or the post-processing system 300) to designate the second focus depth 580. This designation may also be made in a variety of ways, including but not limited to text entry, speech, selection from a menu, clicking or tapping on an indicator such as a slider, selecting a portion of the image, and/or the like.

In a step 650, one or more foreground portions of the image may be identified. This may be done, for example, automatically by the camera 200 and/or the post-processing system. This may be accomplished by referencing the depth information corresponding to the image. Such depth information may take the form of a depth map in which intensity levels, colors, and/or other characteristics are used to indicate the depth at which objects in corresponding portions of the image were positioned, relative to the camera, at the time of image capture. Thus, for example, such a depth map may be used to automatically identify all portions of the image having a depth less than that of the first focus depth received in the step 630.

In a step 660, one or more background portions of the image may be identified. This may be done, for example, automatically by the camera 200 and/or the post-processing system. As in the step 650, this may be accomplished by referencing the depth map or other depth information corresponding to the image. For example, such a depth map may be used to automatically identify all portions of the image having a depth greater than that of the second focus depth received in the step 640.

In a step 670, blurring may be applied to the one or more foreground portions identified in the step 650 and/or to the one or more background portions identified in the step 660. Blurring may be applied through the application of one or more known blurring techniques, which may include mixing color and/or intensity values of a pixel to be blurred with those of surrounding pixels.

More specifically, ignoring the sampling issues caused by the fact that there are a finite number of pixel samples, a fully generalized blur function may be implemented. For example, the 2D bokeh of a point light source may be expressed as an arbitrary function of the three-dimensional coordinates of the point. This may make blur a five-dimensional function. During light-field projection, the five-dimensional function may be implemented as an individual three-dimensional function for each microlens of the two-dimensional array of microlenses (the microlens array 202 of FIG. 2). The individual three-dimensional function may specify the contribution of each sample behind the microlens array 202 as a function of the object distance of the ray source of each sample (one-dimensional variation).

The five-dimensional function may be implemented as an individual three-dimensional function for each pixel of the processed image. Each three-dimensional function may specify the contribution of each pixel in the EDOF source image, as a function of the depth of that pixel. A wide variety of blur-related viewing features, including but not limited to focus distance, depth of field, tilt, focus spread, and additional blur may be implemented as simplified ways to specify the generalized five-dimensional blur function. The five dimensions may be as follows: Point X, Point Y, Point Z, Bokeh X, and Bokeh Y. The blur-related viewing features listed above may be implemented as follows:

Focus distance may shift the entire function along its Point Z dimension;

Depth of field may scale the entire function along its Point Z dimension, centered around the focus distance;

Tilt may shift the entire function along its Point Z dimension, by an amount that is, itself, a linear function of (Point X/Point Z) and/or (Point Y/Point Z);

Focus spread may push the function away from the focus distance in both directions along the Point Z dimension; and Additional Blur may scale Bokeh X and bokeh Y by an additional value (for example, (1.0+the additional blur).

As implemented in light-field projection, generalized blur may also be used to implement higher-level parallax effects such as center-of-perspective and stereo projection. These may simply weight the contributions of the samples behind each microlens in a way that is not radially symmetrical.

Once the desired blurring has been applied, the processed image may be displayed, for example, on the display screen 216 of the post-processing system 300, in a step 680. Then, in a query 690, a determination may be made as to whether the user wishes to modify the focus range, for example, by receiving input from the user via an input device such as the user input 215 of the post-processing system 300 or an input device of the camera 200. If so, the method may return to the step 630 and/or the step 640 so that the user can modify the first focus depth 570 and/or the second focus depth 580. The method may proceed through the step 650, the step 660, the step 670, the step 680, and the query 690 until the user is satisfied with the focus range of the image. When the user is satisfied with the focus range of the image, the query 690 may be answered in the negative. The method may then end 698.

The method of FIG. 6 is only one of many possible methods that may be used to apply depth-based image processing. According to various alternatives, various steps of FIG. 6 may be carried out in a different order, omitted, and/or replaced by other steps. For example, other image processing steps such as color space conversion, blurring, Automatic White Balance (AWB) algorithms and/or any other image processing steps set forth above may be incorporated into the method of FIG. 6, at any stage of the method, and may be carried out with respect to the image prior to, during, and/or after application of effects.

In other examples, the first focus depth 570 and/or the second focus depth 580 may be used to apply different depth-based image processing steps. For example, any known bokeh effect may be applied, including the use of one or more blur shapes in the foreground and/or background. Such shapes need not be circular, and may vary with depth. In yet other examples, linear and/or nonlinear functions may be used to apply blurring and/or other depth-based effects. Examples of such modifications will be shown and described after the description of an exemplary user interface in FIGS. 7 through 29.

EXAMPLES

Figure 7:
FIG. 7 is a screenshot diagram depicting an exemplary user interface for initiation of depth-based image processing, showing an exemplary image, according to one embodiment.

FIG. 7 is a screenshot diagram 700 depicting initiation of processing of an image 710, according to one embodiment. The screenshot diagram 700 illustrates the use of a user interface that facilitates application of depth-based processing to the image 710. The image 710 may be a light-field image, or may be obtained via initial processing of a light-field image. In an alternative embodiment, image 710 may be any other type of image, and need not be a light-field image, as described above.

The image 710 may have a subject portion 712 that the user may wish to keep focused (the boy's face), a foreground portion 714 (the boy's hand and the plane he is holding) closer to the camera than the subject portion 712, and a background portion 716 (the sky, trees, and ground) further from the camera than the subject portion 712. Notably, in FIG. 7, the focus range is broad enough to encompass substantially the entire image; accordingly, the foreground portion 714 and the background portion 716 are not labeled. These portions of the image 710 will be labeled in subsequent figures in which the focus spread of the image 710 is narrowed to provide blurring of the foreground portion 714 and the background portion 716.

As shown, the user interface may display the image 710, and may also display an editing pane 720 in which the user can make various modifications to the image 710. The editing pane 720 may include a focus spread toolbox 730 in which the user can customize the manner in which the image 710 is focused. The editing pane 720 may also include various other toolboxes that can be used to modify other aspects of the image 710.

The focus spread toolbox 730 may, for example, have a focus indicator 740 that indicates the depth at which the image 710 is focused. This may be the first focus depth 570, the second focus depth 580, the average of the first focus depth 570 and the second focus depth 580, and/or any other value indicative of focus depth. The focus spread toolbox 730 may also have a spread indicator 742 that indicates the size of the depth of field, or the size of the focus spread of the image 710. Further, the focus spread toolbox 730 may have a mode indicator 744 that indicates a mode in which the user is currently using the focus spread toolbox 730.

Further, the focus spread toolbox 730 may have a focus slider 750 that can be used to adjust the first focus depth 570 and/or the second focus depth 580. The focus slider 750 may have various elements that facilitate this adjustment, such as a first focus marker 752 and a second focus marker 754. The first focus marker 752 may be positioned at the first focus depth 570, and the second focus marker 754 may be positioned at the second focus depth 580.

The first focus marker 752 and the second focus marker 754 may divide the focus slider 750 into a subject portion 762, a foreground portion 764, and a background portion 766. The left-hand side of the focus slider 750 may represent smaller depth (i.e., objects in the image 710 that are closer to the camera), with depth gradually increasing toward the right-hand side of the focus slider 750. The subject portion 762, the foreground portion 764, and the background portion 766 of the focus slider 750 may correspond to the subject portion 712, the foreground portion 714, and the background portion 716 of the image 710, respectively.

The first focus marker 752 and the second focus marker 754 may be used to set the first focus depth 570 and the second focus depth 580, respectively. If desired, the user may click or tap and drag the first focus marker 752 to the left or right to decrease or increase, respectively, the first focus depth 570. Similarly, the user may click or tap and drag the second focus marker 754 to the left or right to decrease or increase, respectively, the second focus depth 580. Moving the first focus marker 752 to the left may cause portions of the foreground portion 714 of the image 710 to be included in the subject portion 712 rather than the foreground portion 714. Similarly, moving the second focus marker 754 to the right may cause portions of the background portion 716 of the image 710 to be included in the subject portion 712 rather than the background portion 716. The focus slider 750 may be manipulated in various other ways, as will be set forth in connection with FIGS. 13A through 16B.

If desired, no blurring may be applied to the subject portion 712, designated by the subject portion 762 of the focus slider 750. Blurring may be applied to the foreground portion 714 and the background portion 716, with increasing blur applied to portions of the image 710 that are further displaced from the depth of the subject portion 712. This may cause the largest blur to be applied to objects in the image 710 that are closest to and/or furthest from the camera.

In addition to the focus slider 750 and related elements, the focus spread toolbox 730 may have a foreground dropper 774 and a background dropper 776. The foreground dropper 774 and the background dropper 776 may provide an alternative mechanism to manipulation of the first focus marker 752 and the second focus marker 754 to set the first focus depth 570 and the second focus depth 580, respectively. For example, the user may click on the foreground dropper 774 and then click on a portion of the image 710 that is at the desired depth for the first focus depth 570. The first focus depth 570 may then be set to the depth of the portion of the image 710 that was selected with the foreground dropper 774. Similarly, the user may click on the background dropper 776 and then click on a portion of the image 710 that is at the desired depth for the second focus depth 580. The second focus depth 580 may then be set to the depth of the portion of the image 710 that was selected with the background dropper 776.

If neither the foreground dropper 774 nor the background dropper 776 has been selected, the user may click, tap, or otherwise designate a portion of the image 710 at which the image 710 is to be focused. The result may be movement of the subject portion 762 of the focus slider 750 to center on a depth corresponding to that of the selected location of the image 710. This method of refocusing an image will be shown and described in greater detail subsequently, in connection with FIGS. 17 through 29.

In addition to the focus spread toolbox 730, the editing pane 720 may have other toolboxes such as a depth map toolbox 780 and a tilt toolbox 790. The depth map toolbox 780 may have a depth map button 792 that may be clicked or otherwise selected to initiate display of the depth map corresponding to the image 710. The depth map toolbox 780 may also have an image button 794 that may be clicked or otherwise selected to return to display of the image 710. Display of the depth map will be shown and described in connection with FIG. 8.

Figure 8:
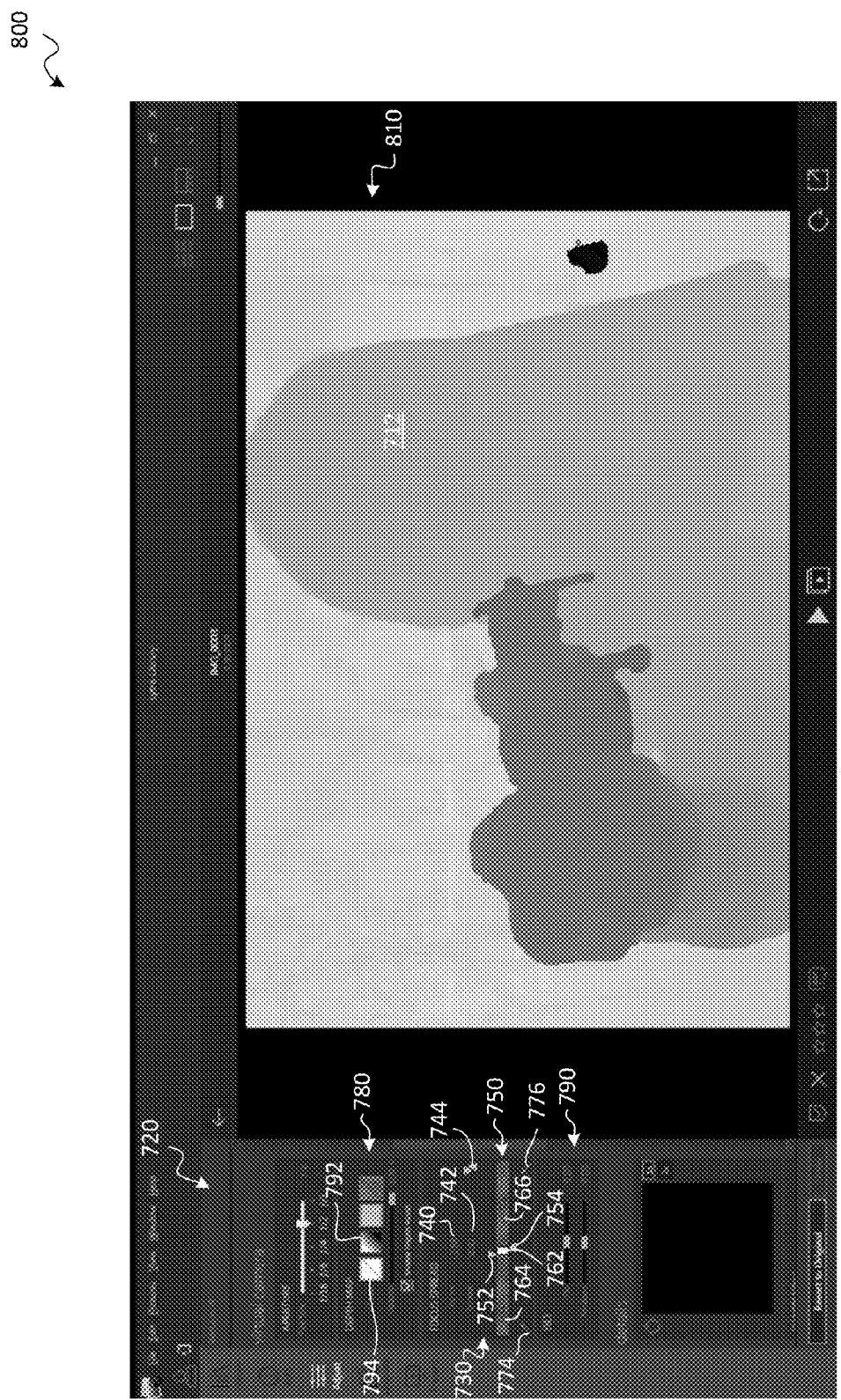
FIG. 8 is a screenshot diagram depicting the user interface of FIG. 7, showing a depth map, according to one embodiment.

FIG. 8 is a screenshot diagram 800 depicting the user interface of FIG. 7, showing a depth map 810, according to one embodiment. This view may be shown after the user has selected the depth map button 792 as described above. The depth map 810 may correspond to the image 710, and may be in grayscale with pixel intensities that indicate the depth of each portion of the image 710. For example, lower intensities (darker pixels) may correspond to lower depths (as in the foreground portion 714) and higher intensities (brighter pixels) may correspond to higher depths (as in the background portion 716).

The depth map 810 may help the user to more easily visualize the depth of each portion of the image 710. Thus, viewing the depth map 810 may help the user to understand the likely effects of manipulating the focus slider 750.

As indicated previously, the user may select the image button 794 to once again display the image 710 as in FIG. 7. In FIG. 7, the subject portion 712, the foreground portion 714, and the background portion 716 are generally in focus. The user may move the first focus marker 752 to control where the depth boundary is between the subject portion 712 and the foreground portion 714. For example, if the user clicks and drags the first focus marker 752 to the right, the result will be to cause some regions of the subject portion 712 to enter the foreground portion 714, where they will be subject to blurring. The foreground portion 714 may be colored during motion of the first focus marker 752 to help the user to visualize which portions of the image 710 will be blurred if the first focus marker 752 remains at its current position. The resulting view will be shown in FIG. 9.

Figure 9:
FIG. 9 is a screenshot diagram depicting the user interface FIG. 7 during selection of a new first focus depth, according to one embodiment.

FIG. 9 is a screenshot diagram 900 depicting the user interface FIG. 7 during selection of a new first focus depth 570, according to one embodiment. As shown, the foreground portion 714 of the image 710 is colored with a blue pattern so that the user can easily visualize the portion of the image 710 that will be blurred with the first focus marker 752 at its current position. The blue pattern may expand, shrink, and/or move to or from other areas of the image 710 in real-time as the first focus marker 752 moves to further enhance visualization. Thus, the user can easily determine which portion(s) of the image 710 are to be blurred as foreground portions of the image 710. If the user releases the first focus marker 752, the portion of the image 710 with the blue pattern will be blurred. The resulting view is shown in FIG. 10.

Figure 10:
FIG. 10 is a screenshot diagram depicting the user interface of FIG. 7 after blurring of foreground portions of the image in response to selection of the new first focus depth, according to one embodiment.

FIG. 10 is a screenshot diagram 1000 depicting the user interface of FIG. 7 after blurring of the foreground portion 714 of the image 710 in response to selection of the new first focus depth 570, according to one embodiment. As shown, the foreground portion 714 of the image 710 now includes the plane and the boy's hand, which are therefore now blurred, reflecting the fact that the first focus marker 752 has been moved to the right to expand the foreground portion 714. This may reduce the size of the subject portion 712, but may also draw attention to particular aspects of the subject portion 712, such as the boy's face.

The user may follow a similar procedure to expand the background portion 716 of the image 710 to cause blurring of objects at a greater depth from the camera. The user may move the second focus marker 754 to the left to reduce the second focus depth 580, thereby causing objects with a depth greater than the second focus depth 580 (in the depth map 810) to be blurred. As with adjustment of the foreground portion 714, adjustment of the background portion 716 may be visualized through the use of a color pattern to show the background portion 716. This will be shown in FIG. 11.

Figure 11:
FIG. 11 is a screenshot diagram depicting the user interface of FIG. 7 during selection of a new second focus depth, according to one embodiment.

FIG. 11 is a screenshot diagram 1100 depicting the user interface of FIG. 7 during selection of a new second focus depth 580, according to one embodiment. As shown, an orange pattern illustrates the portions of the image 710 that will be included in the background portion 716, if the second focus marker 754 remains at its current position on the focus slider 750. These portions of the image 710 may be blurred, as will be shown in FIG. 12.

Figure 12:
FIG. 12 is a screenshot diagram depicting the image of FIG. 7 after blurring of background portions of the image in response to selection of the new second focus depth, according to one embodiment.

FIG. 12 is a screenshot diagram 1200 depicting the image of FIG. 7 after blurring of the background portion 716 of the image 710 in response to selection of the new second focus depth 580, according to one embodiment. As shown, some blurring has been applied to the trees and the sky behind the boy. This blurring may be applied to the portions of the image 710 that were shown with the orange pattern in FIG. 11. This blurring may serve to further draw attention to the boy's face.

In the alternative to the use of the first focus marker 752 and the second focus marker 754 to obtain the blurring of FIG. 12, the foreground dropper 774 and/or the background dropper 776 may be used. For example, the user may use the foreground dropper 774 to select a location on the boy's arm, indicating that the boy's hand and the plane are to be included in the foreground portion 714. Similarly, the user may use the background dropper 776 to select a location on the ground to indicate that the ground, trees, and sky behind that selected should be included in the background portion 716.

The focus spread toolbox 730 may be manipulated in various other ways to further facilitate user designation of how the image 710 is to be focused and/or blurred. Some of these will be shown and described in connection with FIGS. 13A through 16B.

FIGS. 13A and 13B are screenshot diagrams 1300 and 1350 depicting the focus spread toolbox 730 of the user interface of FIG. 7, in a positive-only spread mode and a negative spread mode, respectively, according to one embodiment. As indicated previously, the mode indicator 744 may indicate the mode in which the user is currently interacting with the focus spread toolbox 730.

Specifically, the mode indicator 744 of FIG. 13A may indicate that the user is in the positive-only spread mode. In such a mode, the first focus marker 752 and the second focus marker 754 may not be dragged past each other. Thus, the user may be able to reduce the focus spread to zero, but a negative focus spread would not be possible. If the user wishes to enable the use of a negative focus spread, he or she may click, tap, or otherwise select the mode indicator 744 to change to a negative spread mode. The resulting view is shown in FIG. 13B.

In FIG. 13B, the mode indicator 744 has changed to indicate that the user is using the toolbox 730 in the negative spread mode. In this mode, the user may select and move either of the first focus marker 752 and the second focus marker 754 past the other. In FIG. 13B, the user has clicked and dragged the first focus marker 752 to the right in the direction of the arrow 1360, past the second focus marker 754. The result is the presence of a negative spread portion 1370 (colored red instead of white to indicate that it is a negative spread portion) in place of the subject portion 762. This substitution may be done because the subject portion 762 may not be present—no part of the image 710 may be in focus. Rather, the entire image 710 may be blurred. The blurring may be least within the negative spread portion 1370, and may increase with increasing depth differential relative to the negative spread portion 1370.

If the user again selects the mode indicator 744, the focus spread toolbox 730 may return to the positive-only spread mode. Further, the first focus marker 752 and the second focus marker 754 may move together to eliminate the negative spread portion 1370. The user may then again be unable to move the first focus marker 752 to the right of the second focus marker 754, or move the second focus marker 754 to the left of the first focus marker 752.

FIGS. 14A and 14B are screenshot diagrams 1400, 1450 depicting the focus spread toolbox 730 of the user interface of FIG. 7, illustrating movement of the entire subject portion 762, according to one embodiment. As shown, the user need not necessarily move the first focus marker 752 and/or the second focus marker 754, but may instead elect to move the entire subject portion 762. As shown in FIG. 14A, this may be done by clicking on the subject portion 762 and dragging to the left or right, to move the subject portion 762 to a new position, as indicated by the arrows 1420. Alternatively, as shown in FIG. 14B, the user may click on the focus slider 750 (for example, anywhere on the focus slider 750 except on the first focus marker 752 or the second focus marker 754) and dragging to the left or right, as indicated by the arrows 1470, to cause subject portion 762 to move continuously to the left or right, respectively, until the user stops dragging.

The result may be motion of the entire subject portion 762 to the left or right. The subject portion 762 may remain the same size, but the foreground portion 764 may expand while the background portion 766 contracts, or vice versa. The first focus marker 752 and the second focus marker 754 may both move to the left or right, representing simultaneous reduction or increase of the first focus depth 570 and the second focus depth 580.

The user may even move one or both of the first focus marker 752 and the second focus marker 754 to the left or right, off the end of the focus slider 750. The result may be elimination of one of the foreground portion 764 and the background portion 766 (and thus elimination of one of the foreground portion 714 and the background portion 716 of the image 710) if only one of the first focus marker 752 and the second focus marker 754 is moved off the end of the focus slider 750. If the first focus marker 752 and the second focus marker 754 are both moved off the end of the focus slider 750, the result may also be elimination of the subject portion 762 (and thence, the subject portion 712 of the image 710) as will be shown in FIG. 16B.

FIGS. 15A and 15B are screenshot diagrams 1500, 1550 depicting the focus spread toolbox 730 of the user interface of FIG. 7, before and after clicking on the focus slider 750, according to one embodiment. If the user clicks or taps (but does not hold) the focus slider 750 at a location 1570, the subject portion 762 may be moved to the location 1570 of the click or tap. Thus, the user may easily reposition the first focus marker 752 and the second focus marker 754. This method may be used in place of clicking and dragging the subject portion 762 or the focus slider 750 as described in connection with FIGS. 14A and 14B.

FIGS. 16A and 16B are screenshot diagrams 1600, 1650 depicting the focus spread toolbox 730 of the user interface of FIG. 7, before and after clicking and dragging on the focus slider 750 to move subject portion 762 off of the focus slider 750 entirely, according to one embodiment. In FIG. 16A, the user may click on the focus slider 750 and drag leftward in the direction of the arrow 1660 to move the subject portion 762 to the left, as set forth in FIG. 14. If the user continues the drag operation, the subject portion 762 continues to move leftward until the first focus marker 752 and the second focus marker 754 have both passed across the left end of the focus slider 750. The resulting view is shown in FIG. 16B.

In FIG. 16B, the first focus marker 752, the second focus marker 754, the subject portion 762, and the foreground portion 764 have all been moved across the left edge of the focus slider 750. An arrow 1670 may be shown at the left edge of the focus slider 750 to indicate that the focus spread is past the left edge of the focus slider 750.

The result of the configuration of FIG. 16B may be that the entire image 710 is part of the background portion 766. Blurring may be applied to the entire image 710, with increasing blurring with increasing distance from the camera. The user may retrieve the first focus marker 752, the second focus marker 754, the subject portion 762, and the foreground portion 764 by clicking on the focus slider 750 and dragging to the right, until they are again visible. Alternatively, the user may click on a location within the focus slider 750 to cause the subject portion 762 to move to that location, as described above in connection with FIG. 15B.

FIGS. 17 through 29 are examples of depth-based blurring of a different light-field image. These drawings illustrate the use of different features and procedures, per the description below.

Figure 17:
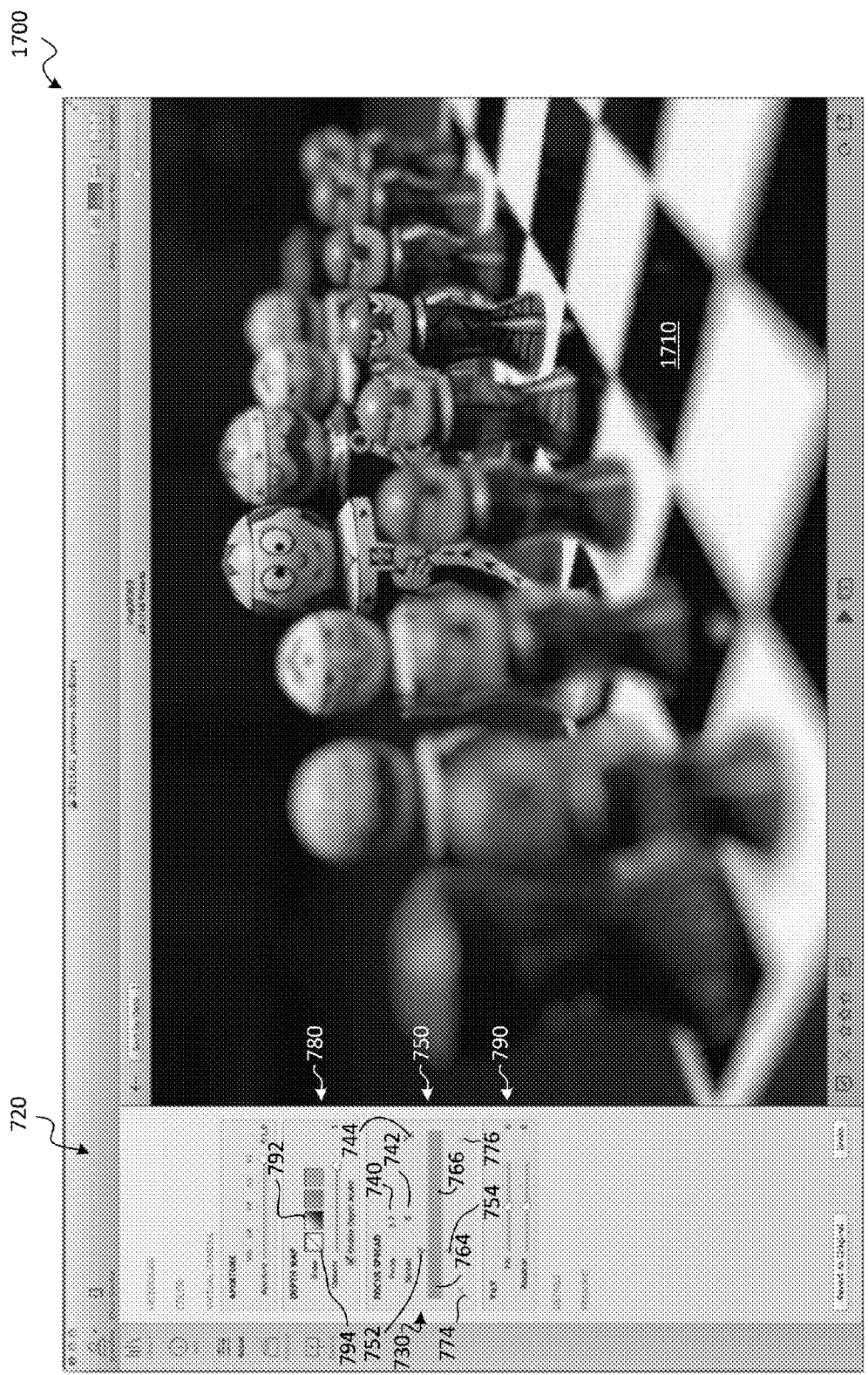
FIG. 17 is a screenshot diagram depicting an exemplary user interface for initiation of depth-based image processing, showing an exemplary image, according to another embodiment.

FIG. 17 is a screenshot diagram 1700 depicting an exemplary user interface for initiation of depth-based image processing, showing an exemplary image 1710, according to another embodiment. The user interface of FIG. 17 may be similar to that of FIG. 7; accordingly, the user interface of FIG. 17 may have an editing pane 720 with components that are similar to those of the editing pane 720 of FIG. 7, and therefore are numbered with the same numerals used in FIG. 7.

As shown, the image 1710 is of a chessboard with chess pieces. In FIG. 17, the focus is set in the middle of the refocusable range from the original image capture. Thus, the extent to which the image 1710 is focused (or conversely, blurred) varies among the pieces on the chessboard. The pieces vary in distance from the camera; accordingly, use of a single focus depth results in pieces that are nearer to or further from the focus depth appearing out-of-focus, or blurred.

Figure 18:
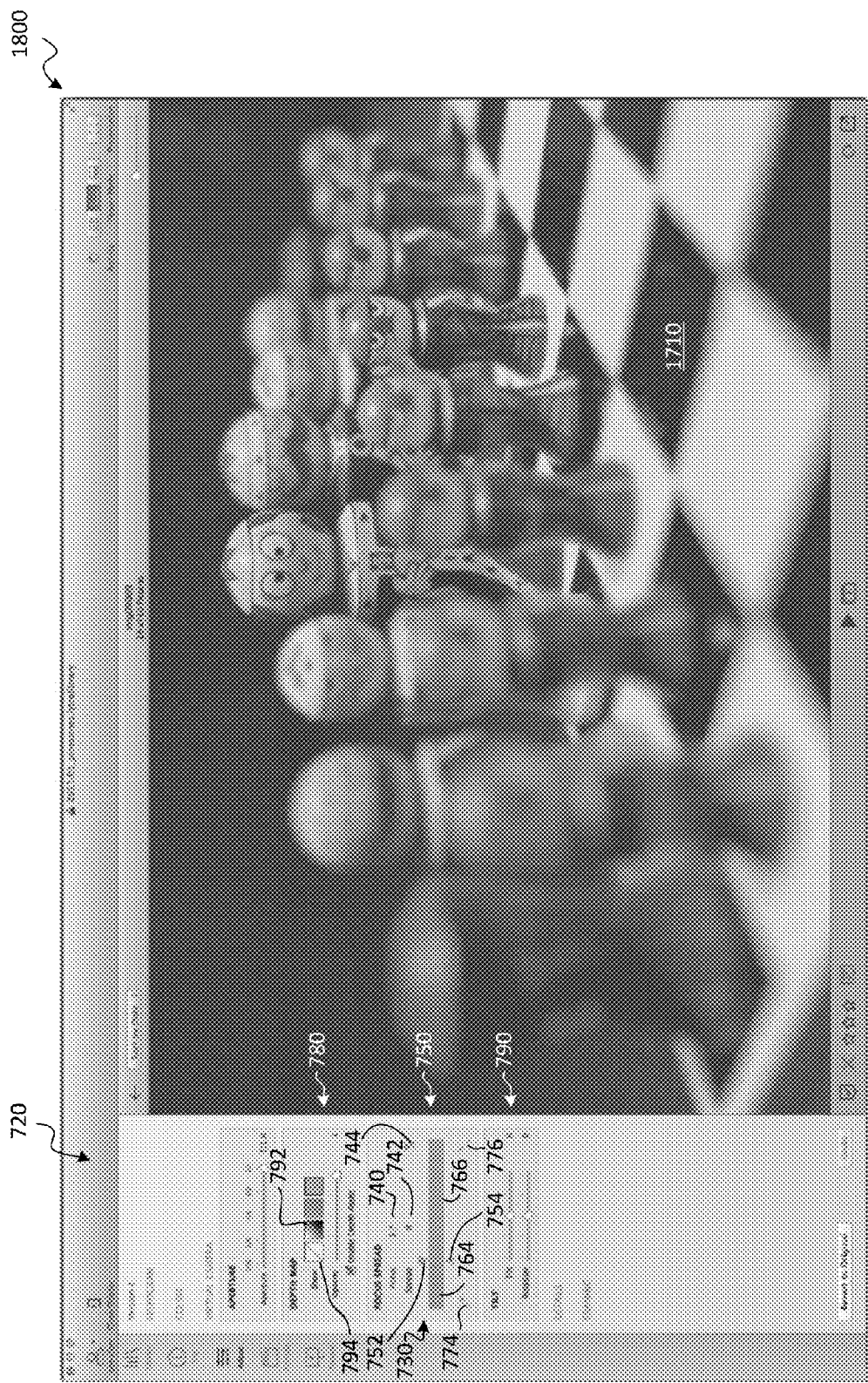
FIG. 18 is a screenshot diagram depicting the exemplary user interface of FIG. 17, with the focus spread overlay toggled to "On," according to one embodiment.

FIG. 18 is a screenshot diagram 1800 depicting the exemplary user interface of FIG. 17, with the focus spread overlay toggled to "On," according to one embodiment. This selection may be made in the depth map toolbox 780 of the editing pane 720. The plane of focus is visible as a sharp transition from the blue to orange hashing in the overlay on the image. There is currently no focus spread region which is in focus (and hence, no subject portion 762 visible on the focus slider 750 of the toolbox 730). Rather, focus may be limited to a plane at a generally uniform depth in the image 1710.

Figure 19:
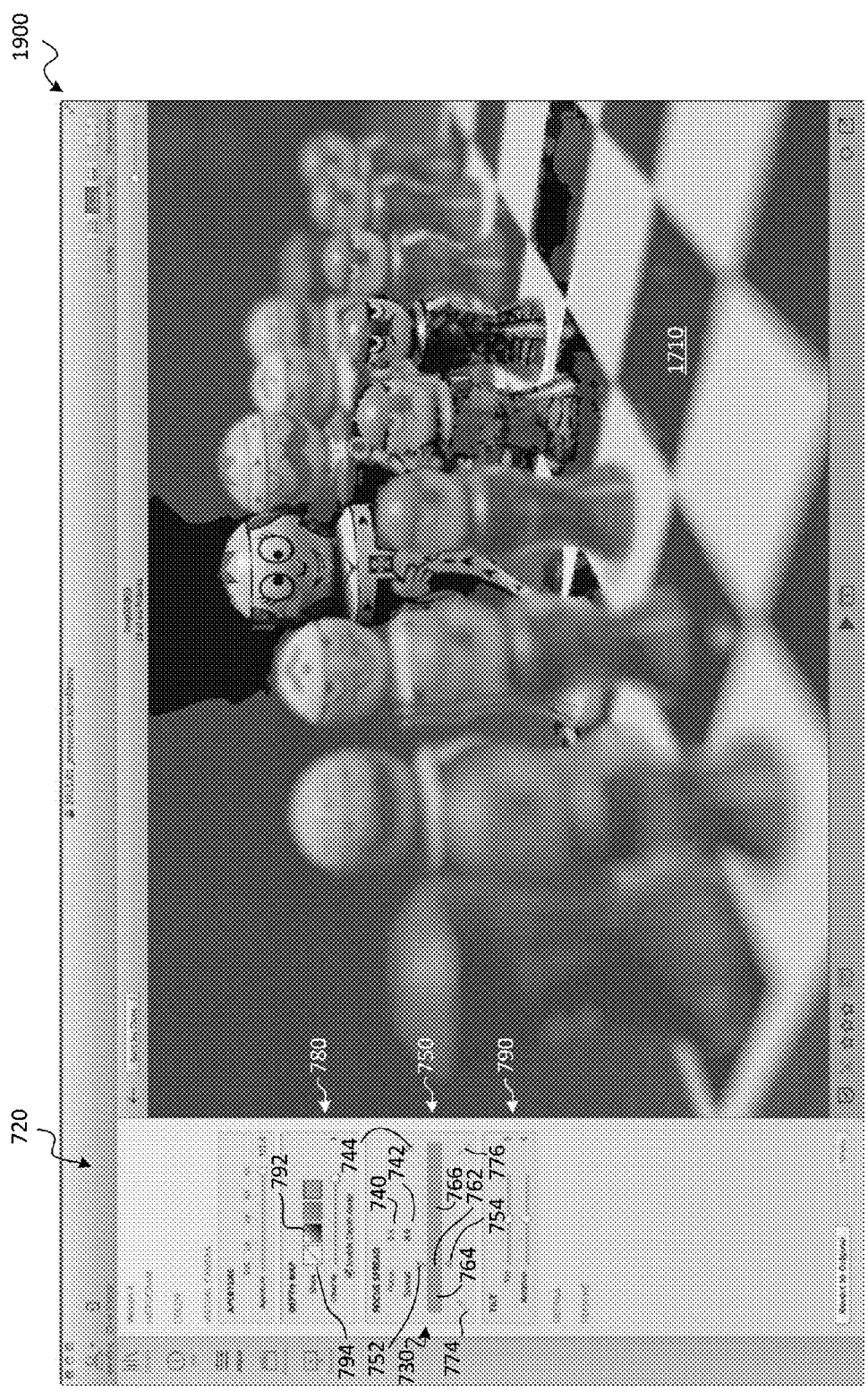
FIG. 19 is a screenshot diagram depicting the exemplary user interface of FIG. 17, after the user has moved the first focus marker and the second focus marker apart, according to one embodiment.

FIG. 19 is a screenshot diagram 1900 depicting the exemplary user interface of FIG. 17, after the user has moved the first focus marker 752 and the second focus marker 754 apart, according to one embodiment. This may define a subject portion 762 on the focus slider 750, as in FIG. 7. The subject portion 762 may correspond to a broader region (i.e., more than a single depth plane) of the image 1710 that is now in focus. Here, the focus spread overlay is toggled "On" via the depth map toolbox 780. The spread of the in-focus region is visible as a transparent region between the blue and orange overlay hashing on the image 1710.

Figure 20:
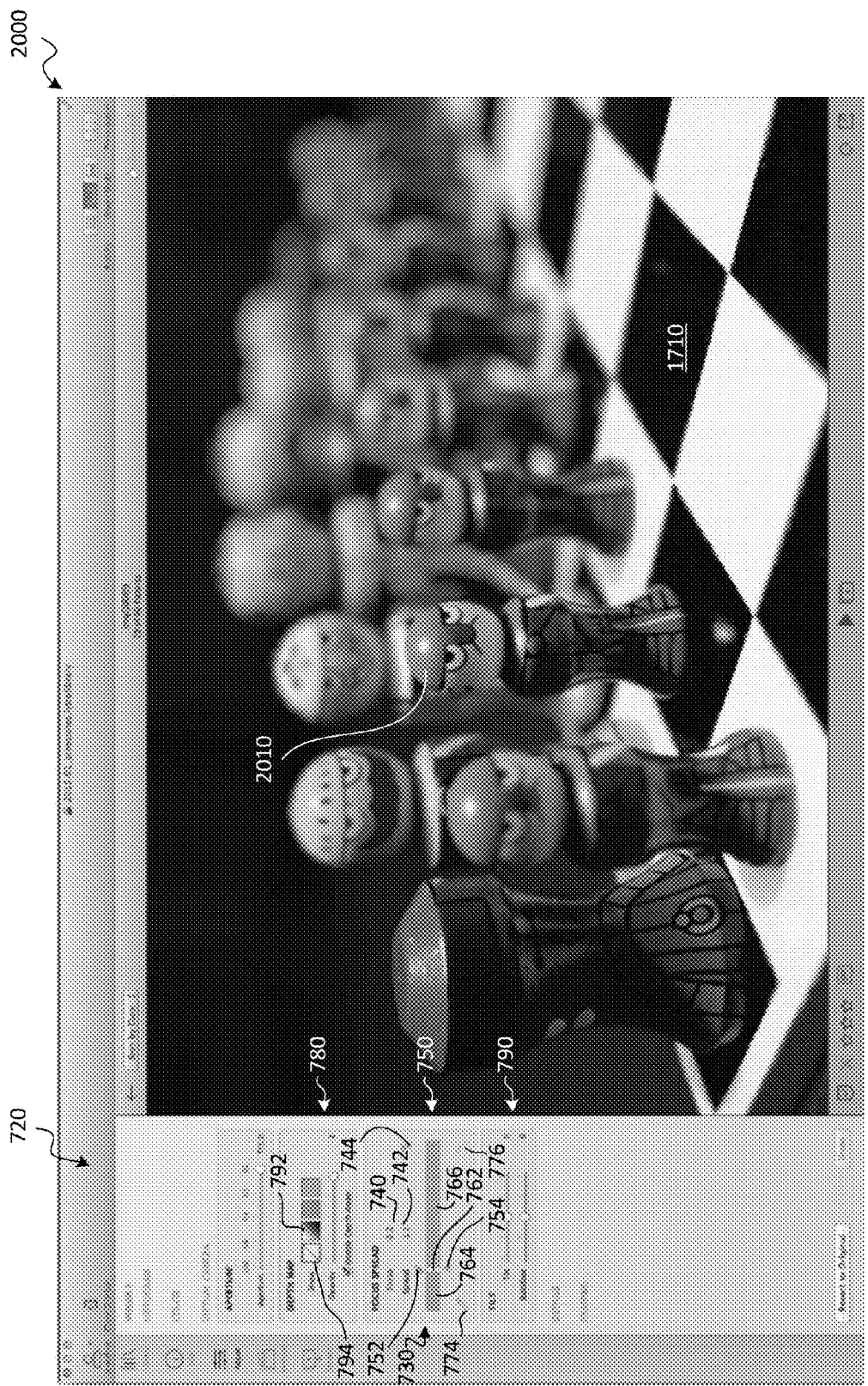
FIG. 20 is a screenshot diagram depicting the exemplary user interface of FIG. 17, after the user has designated a location in the image to refocus the image to that location.

FIG. 20 is a screenshot diagram 2000 depicting the exemplary user interface of FIG. 17, after the user has designated a location 2010 in the image 1710 to refocus the image 1710 to the location 2010. The in-focus region may jump to the location 2010 on the image 1710 that the user has clicked, tapped, or otherwise designated. Here, the user has clicked close to or on the pawn that is second-to-nearest to the camera. Accordingly, this pawn (and the rook beside it, which is at approximately the same depth) may both be in focus.

Figure 21:
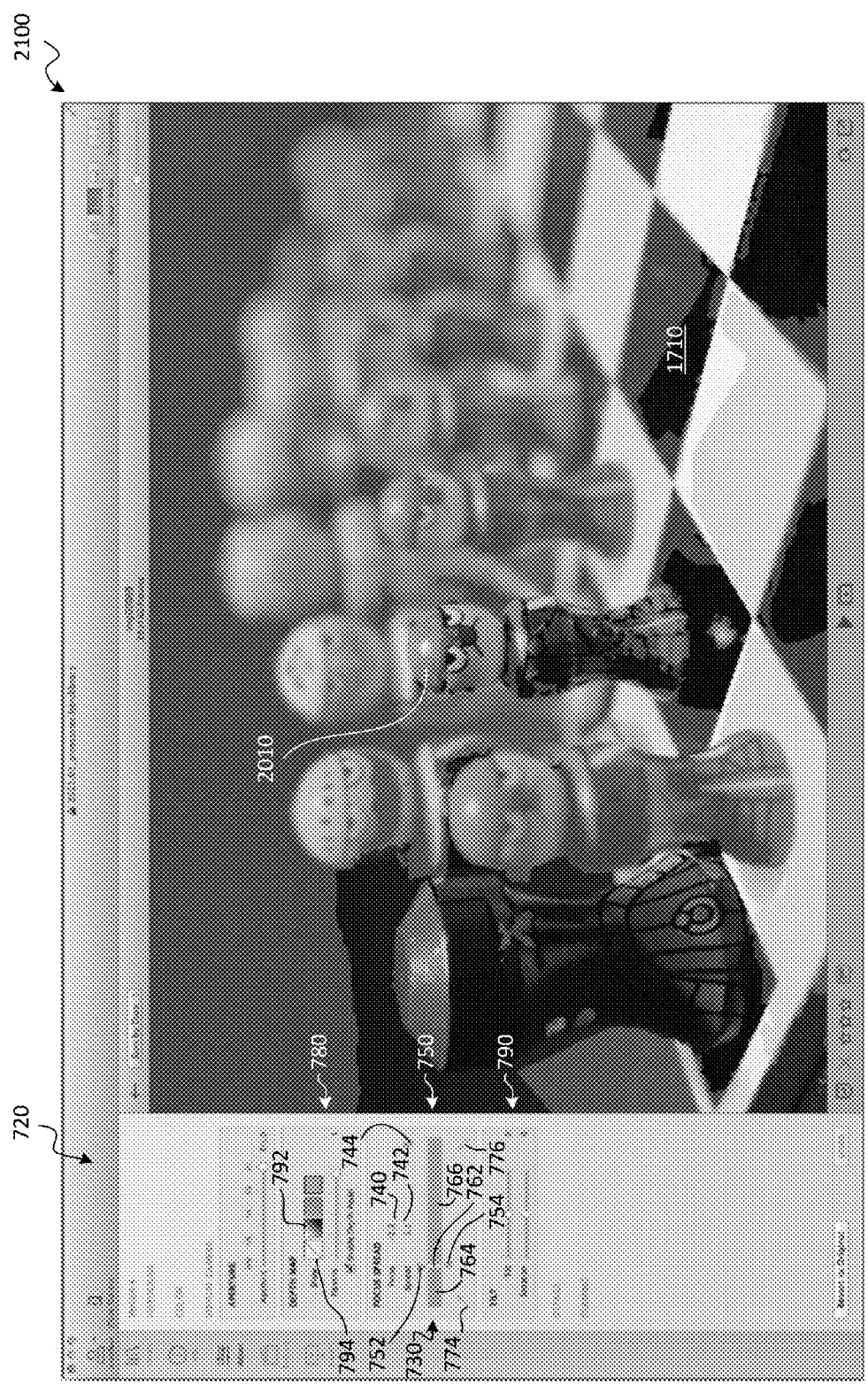
FIG. 21 is a screenshot diagram depicting the exemplary user interface of FIG. 17 after user designation of a location on the image as in FIG. 20, and after the focus spread overlay has been enabled.

FIG. 21 is a screenshot diagram 2100 depicting the exemplary user interface of FIG. 17 after user designation of location 2010 on the image 1710 as in FIG. 20, and after the focus spread overlay has been enabled. The in-focus region is indicated where the user has clicked on the image close to or on the pawn that is second-to-nearest to the camera).

Figure 22:
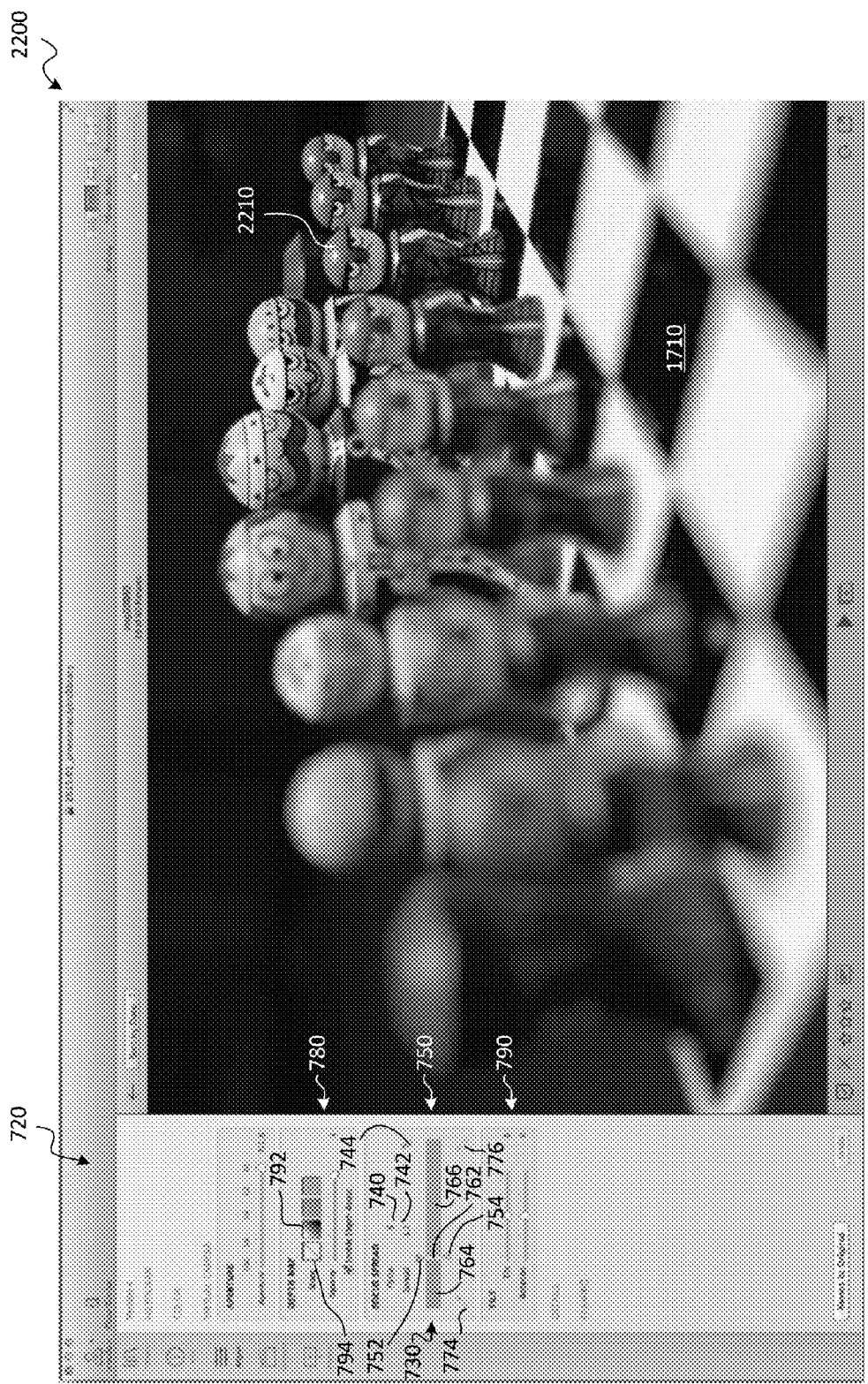
FIG. 22 is a screenshot diagram depicting the exemplary user interface of FIG. 17 after the user has designated a different location on the image to refocus the image to that location.

FIG. 22 is a screenshot diagram 2200 depicting the exemplary user interface of FIG. 17 after the user has designated a different location 2210 on the image 1710 to refocus the image 1710 to that location. The in-focus region may again jump to the location 2210 on the image 1710 that the user has clicked, tapped, or otherwise designated. Here, the user has clicked close to the pawn that is the third-to-furthest from the camera. Accordingly, this pawn, and adjacent pieces at similar depth levels, are in focus.

Figure 23:
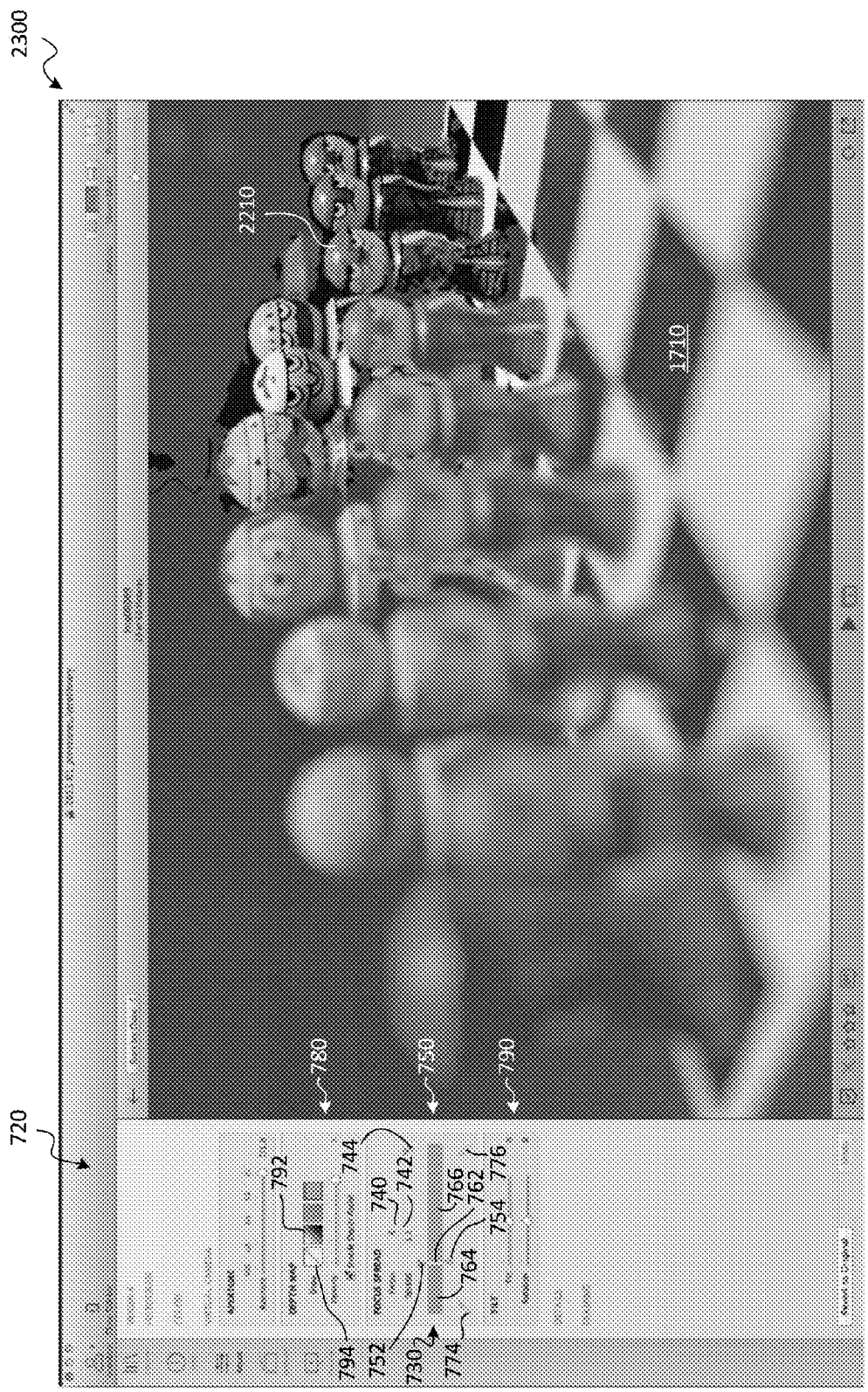
FIG. 23 is a screenshot diagram depicting the exemplary user interface of FIG. 17 after user designation of a different location on the image as in FIG. 22, and after the focus spread overlay has been enabled.

FIG. 23 is a screenshot diagram 2300 depicting the exemplary user interface of FIG. 17 after user designation of location 2210 on the image 1710 as in FIG. 22, and after the focus spread overlay has been enabled. The in-focus region is indicated at the location 2210 where the user has clicked on the image 1710 (close to the pawn that is the third-to-furthest from the camera).

Figure 24:
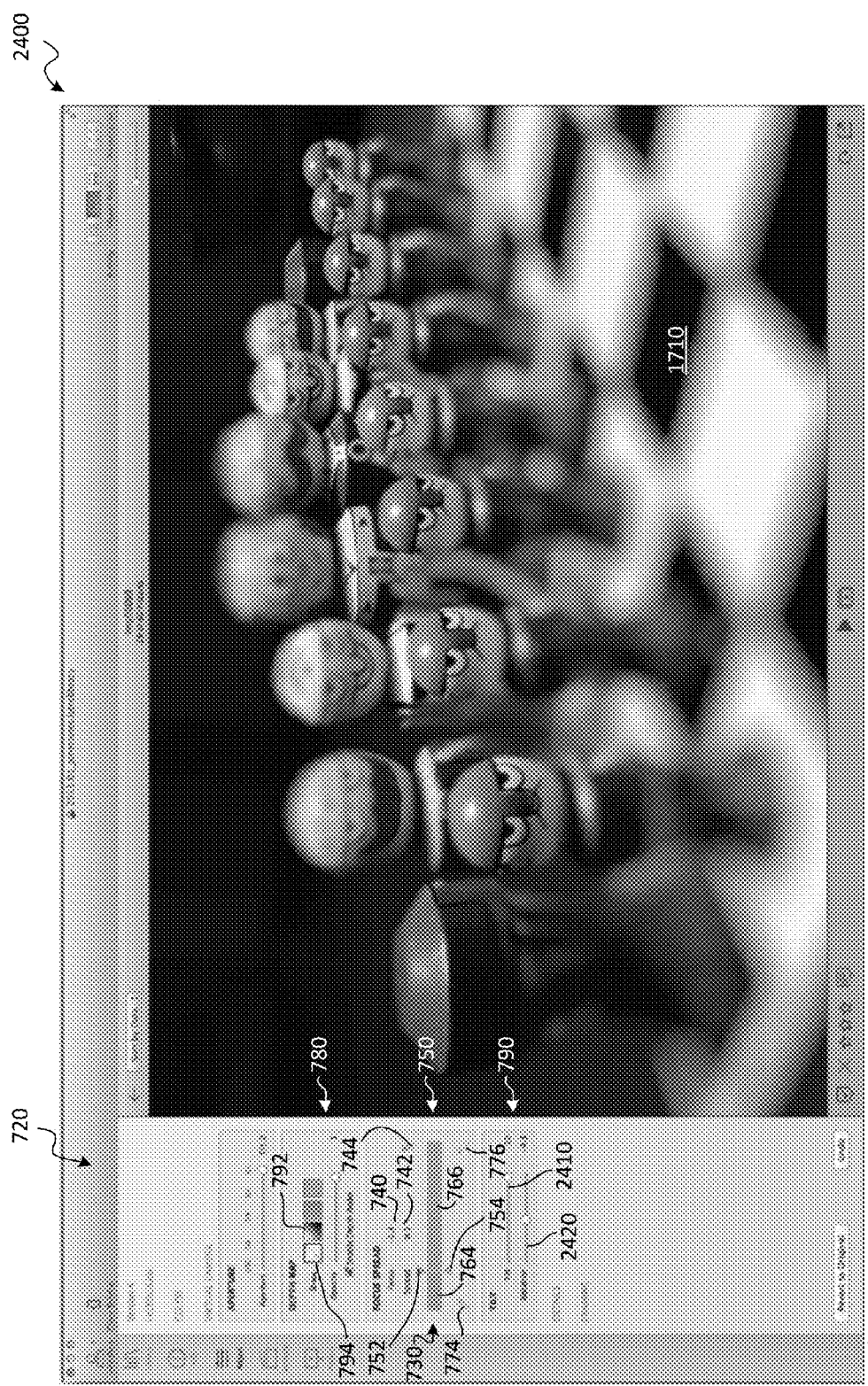
FIG. 24 is a screenshot diagram depicting the exemplary user interface of FIG. 17 after modification of the tilt controls in the tilt toolbox of the editing pane.

FIG. 24 is a screenshot diagram 2400 depicting the exemplary user interface of FIG. 17 after modification of the tilt controls in the tilt toolbox 790 of the editing pane 720. More specifically, the tilt toolbox 790 may have a tilt slider 2410 and a rotation slider 2420 that can be used to orient the focus plane, which may be the plane at which the image 1710 is focused (or the plane at which focus of the image 1710 is centered, if the first focus marker 752 and the second focus marker 754 are spread apart to focus the image 1710 at a broader range than a single plane). The tilt slider 2410 may "tilt," or rotate, the focus plane about an axis that can be oriented via adjustment of the rotation slider 2420. With the rotation slider 2420 centered, the axis of rotation about which the focus plane rotates with adjustment of the tilt slider 2410 may be horizontal.

In FIG. 24, the user has tilted the focus plane with the tilt slider 2410 to more closely match the uniform heights of the pawn faces on the chessboard. A subtle adjustment of the rotation, with the rotation slider 2420, orients the in-focus region around the center of the image 1710.

Figure 25:
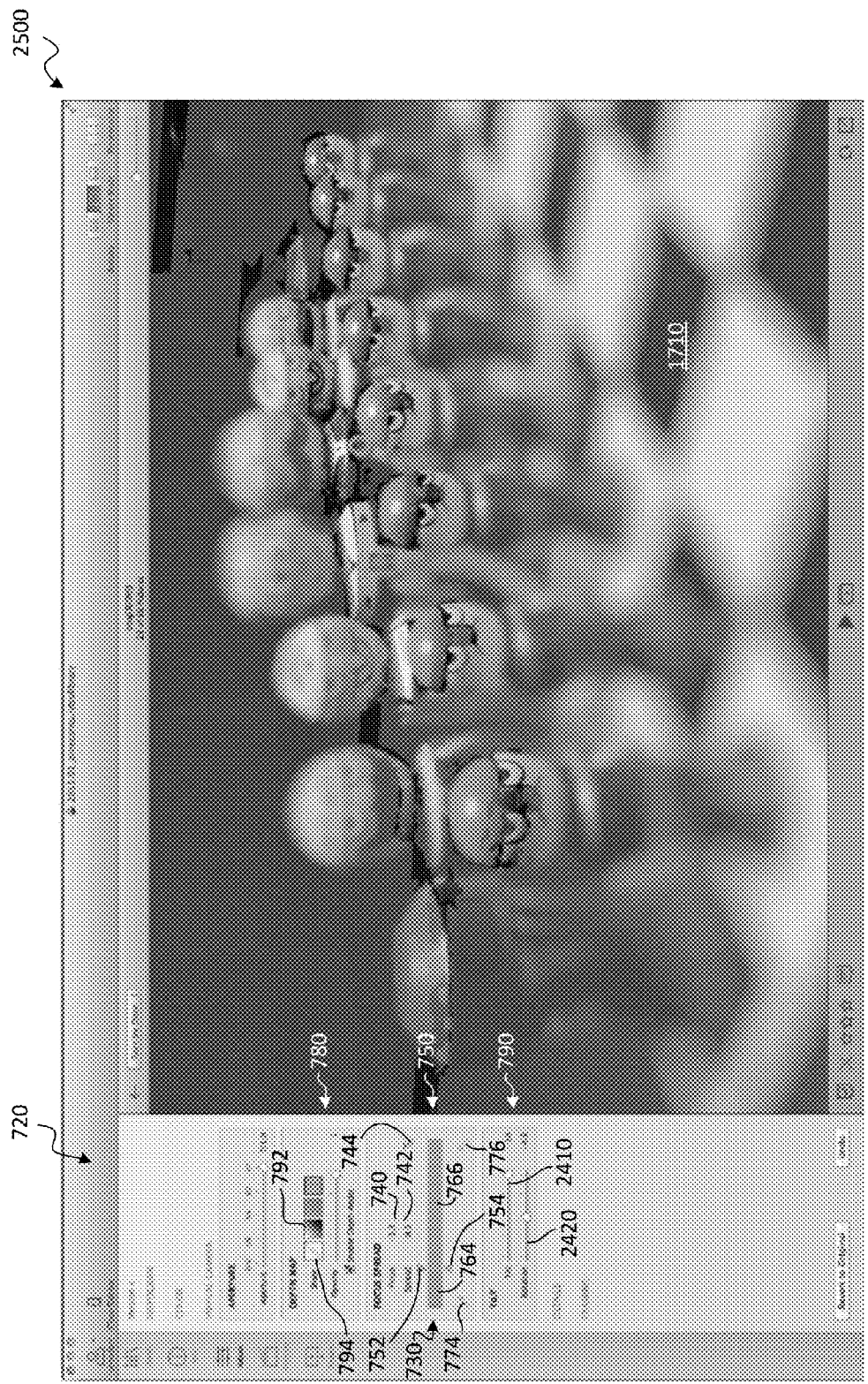
FIG. 25 is a screenshot diagram depicting the exemplary user interface of FIG. 17 after user adjustment of the tilt slider and the rotation slider in FIG. 24, and after the focus spread overlay has been enabled.

FIG. 25 is a screenshot diagram 2500 depicting the exemplary user interface of FIG. 17 after user adjustment of the tilt slider 2410 and the rotation slider 2420 in FIG. 24, and after the focus spread overlay has been enabled. The in-focus region is indicated as the faces of the pawns.

Figure 26:
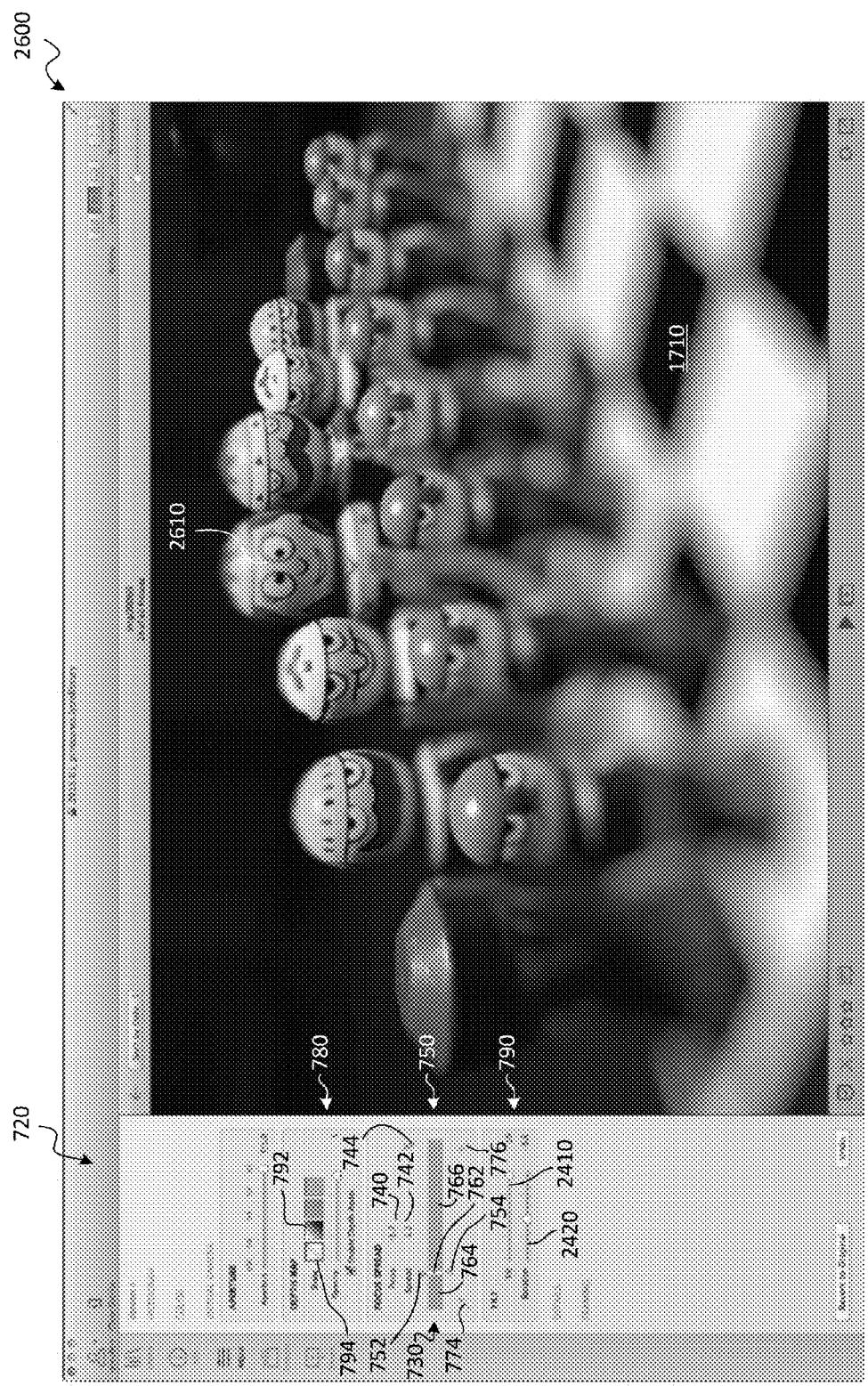
FIG. 26 is a screenshot diagram depicting the exemplary user interface of FIG. 17 after user adjustment of the tilt slider and the rotation slider in FIG. 24, and after the user has designated another different location on the image to refocus the image to that location.

FIG. 26 is a screenshot diagram 2600 depicting the exemplary user interface of FIG. 17 after user adjustment of the tilt slider 2410 and the rotation slider 2420 in FIG. 24, and after the user has designated another different location on the image 1710 to refocus the image 1710 to that location. The tilted in-focus region jumps to where the user has clicked on the image 170. Here, the user has clicked on the face 2610 of the queen on the chessboard, resulting in the heads of the back row of chess pieces being generally in focus.

Figure 27:
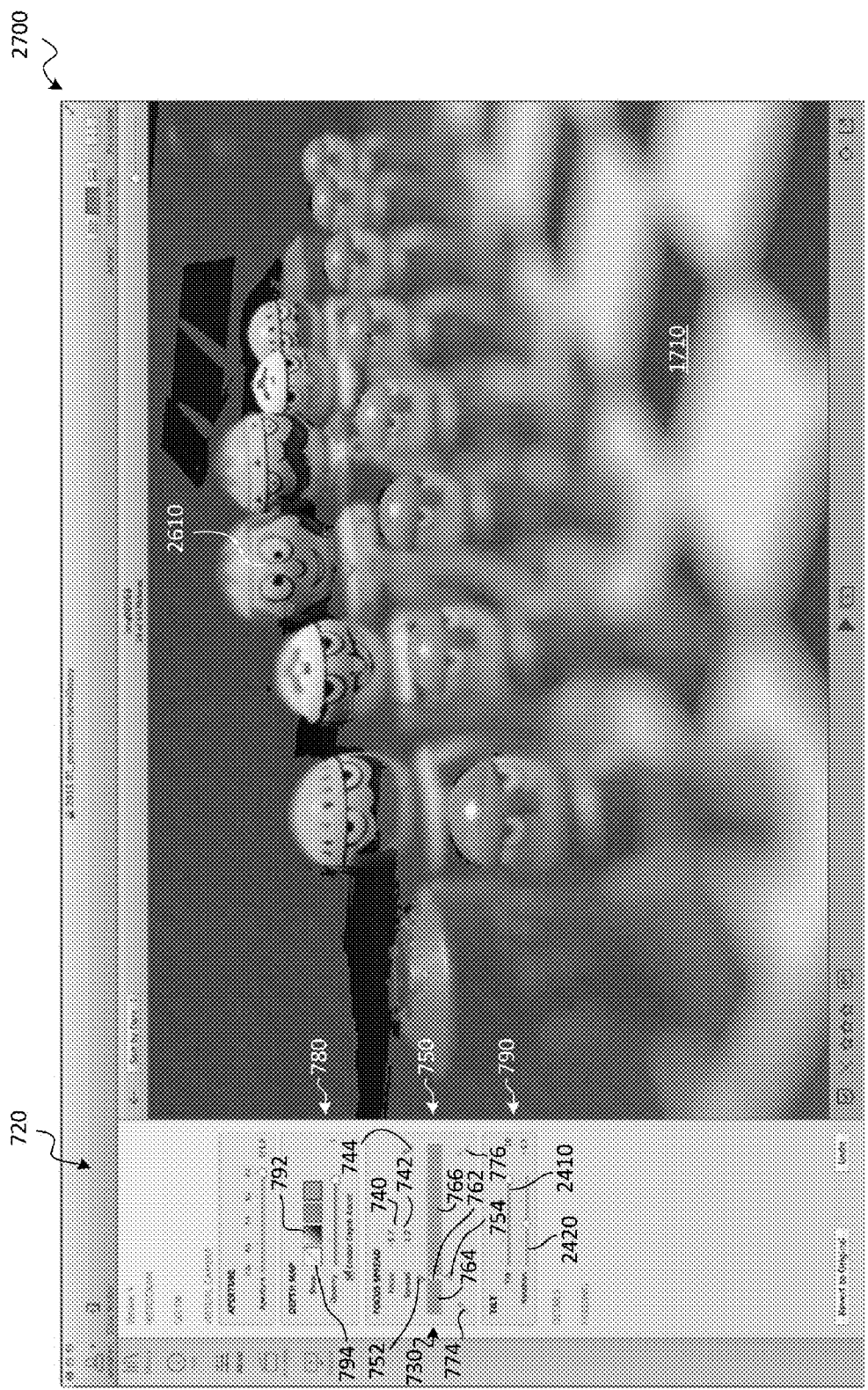
FIG. 27 is a screenshot diagram depicting the exemplary user interface of FIG. 17 after user adjustment of the tilt slider and the rotation slider in FIG. 24 and designation of a new in-focus region in FIG. 26, and after the focus spread overlay has been enabled.

FIG. 27 is a screenshot diagram 2700 depicting the exemplary user interface of FIG. 17 after user adjustment of the tilt slider 2410 and the rotation slider 2420 in FIG. 24 and designation of a new in-focus region as in FIG. 26, and after the focus spread overlay has been enabled. The in-focus region is indicated as the heads of the back row of chess pieces.

Figure 28:
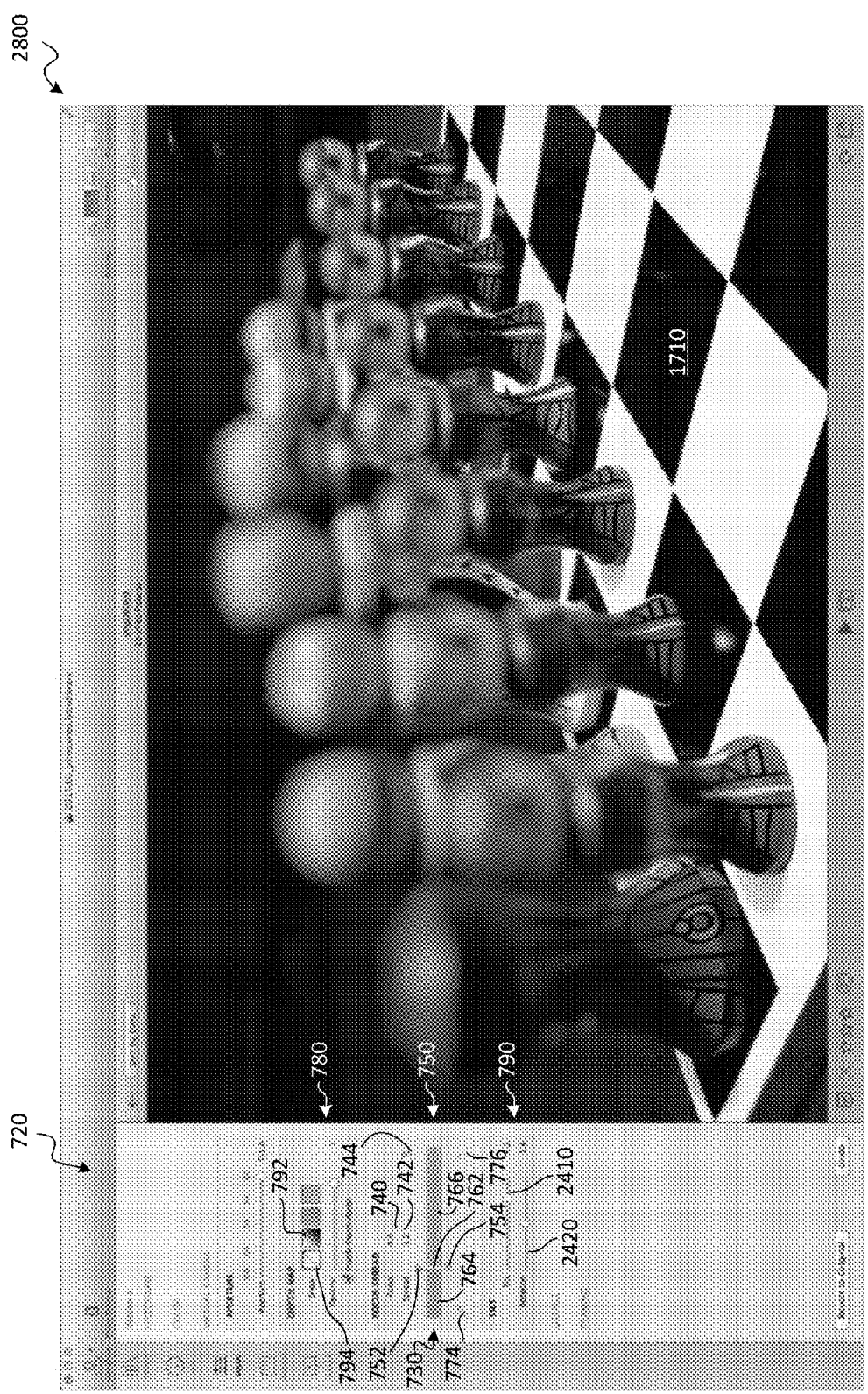
FIG. 28 is a screenshot diagram depicting the exemplary user interface of FIG. 17 after user adjustment of the tilt slider and the rotation slider in FIG. 24, and after the user has designated another different location on the image to refocus the image to that location.

FIG. 28 is a screenshot diagram 2800 depicting the exemplary user interface of FIG. 17 after user adjustment of the tilt slider 2410 and the rotation slider 2420 in FIG. 24, and after the user has designated another different location on the image 1710 to refocus the image 1710 to that location. The tilted in-focus region jumps to where the user has clicked on the image 170. Here, the user has clicked on the base of one of the pawns, resulting in the in-focus display of the checkerboard and the bases of all of the chess pieces.

Figure 29:
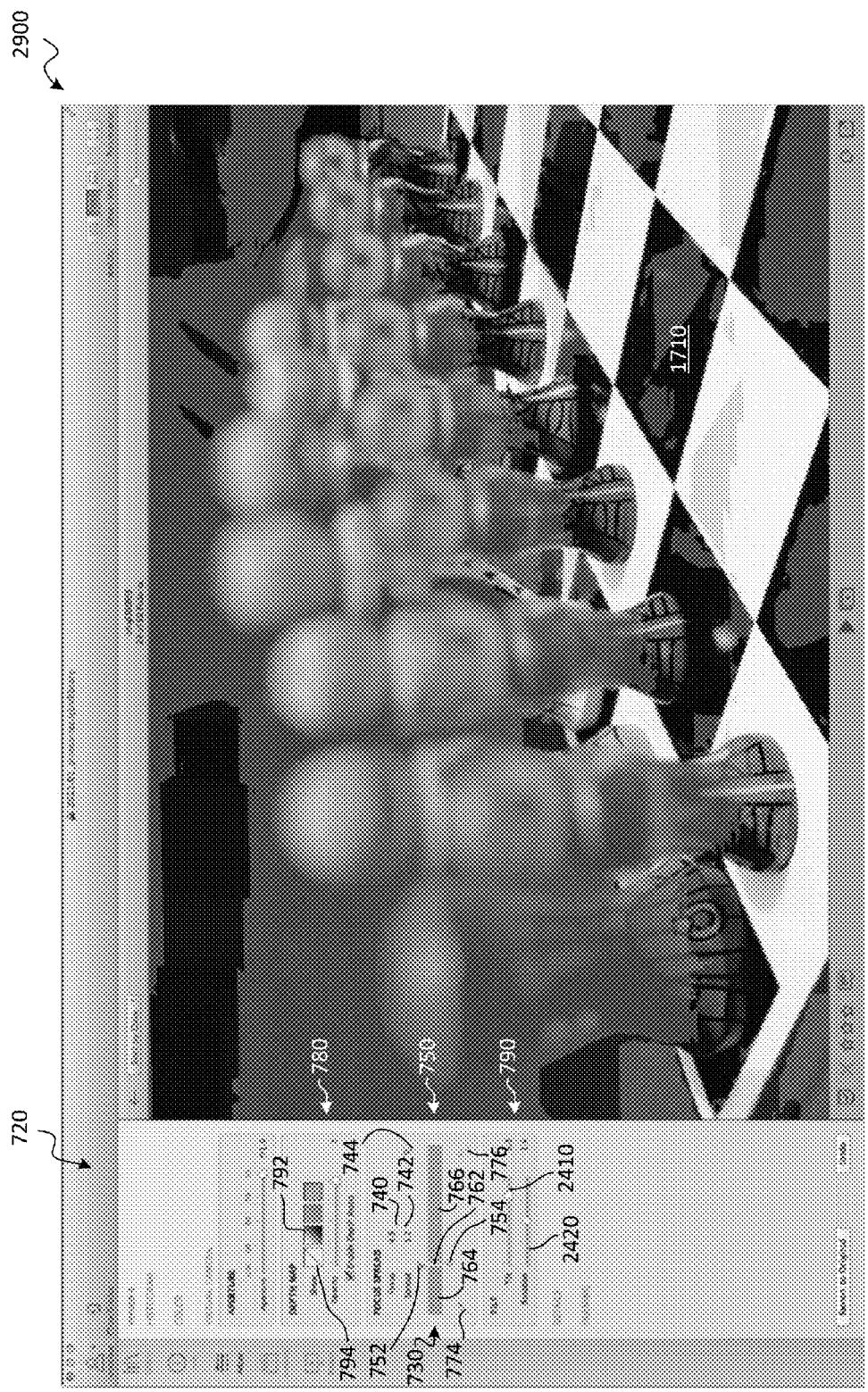
FIG. 29 is a screenshot diagram depicting the exemplary user interface of FIG. 17 after user adjustment of the tilt slider and the rotation slider in FIG. 24 and designation of a new in-focus region in FIG. 28, and after the focus spread overlay has been enabled.

FIG. 29 is a screenshot diagram 2900 depicting the exemplary user interface of FIG. 17 after user adjustment of the tilt slider 2410 and the rotation slider 2420 in FIG. 24 and designation of a new in-focus region in FIG. 28, and after the focus spread overlay has been enabled. The in-focus region is indicated as the checkerboard and the bases of all of the chess pieces.

FIGS. 7 through 29 are merely exemplary. Those of skill in the art will recognize that a wide variety of depth-based effects may be applied in addition to or in the alternative to blurring. Such effects may be applied according to a wide variety of functions, which may include linear and nonlinear functions. A few exemplary variations will be shown and described in connection with FIGS. 30A through 31B.

Variations

As indicated previously, various bokeh effects may be applied through the selection of a focus spread. The systems and methods set forth above for establishing a focus spread may be used to control the application of such bokeh effects. One exemplary bokeh effect is a blur shape, which may appear as a halo around a bright location in the blurred portion of an image. The system and method of the present disclosure may be used to apply such blur shapes. Exemplary blur shapes will be shown and described in connection with FIGS. 30A through 30D.

Figure 30B:
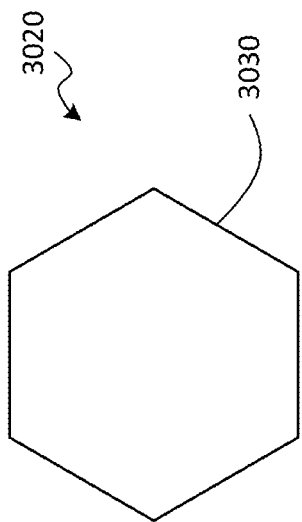
FIGS. 30A, 30B, 30C, and 30D are schematic block diagrams of various blur shapes that may be used to apply bokeh effects, according to exemplary embodiments.
Figure 30D:
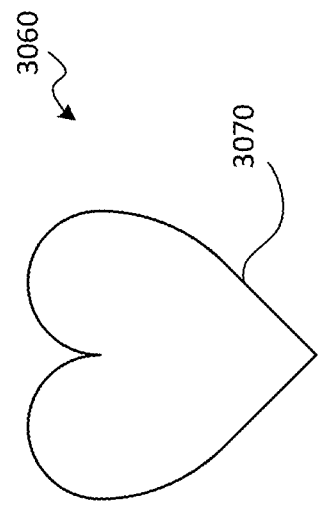
Figure 30A:
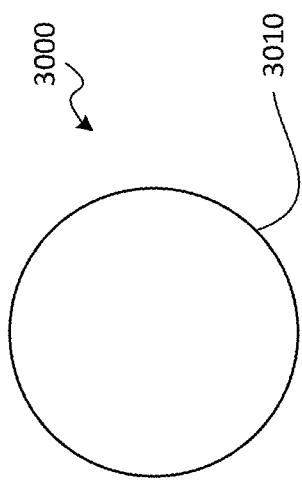
Figure 30C:
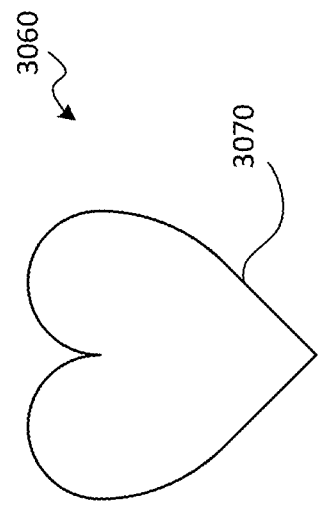

FIGS. 30A, 30B, 30C, and 30D are schematic block diagrams 3000, 3020, 3040, 3060 of various blur shapes that may be used to apply bokeh effects, according to exemplary embodiments. More specifically, FIG. 30A illustrates a circular shape 3010, which may simulate the blur shape that may be captured with the circular lens of a traditional camera. FIG. 30B illustrates a hexagonal shape 3030. FIG. 30C illustrates a star shape 3050, with four points. FIG. 30D illustrates a heart shape 3070.

These are merely examples of blur shapes that may be used for bokeh effects. In some embodiments, other blur shapes may be used, such as other polygonal shapes, ellipses, shapes with mixed curves and straight segments, and other fanciful shapes. If desired, an image may have more than one blur shape applied to it. Such different blur shapes may be applied based on depth (Z coordinate), horizontal or vertical location (X or Y coordinates), or other factors. In some embodiments, variable blur shapes may be used with variation based on distance from the focus spread.

Thus, for example, the near background (the region of the background portion 716 closest to the second focus depth 580) may have one shape, while the far background (the region of the background portion 716 furthest from the second focus depth 580) may have a different shape. The transition between the two shapes may be abrupt or smooth. If desired, a series of intermediate shapes may automatically be generated, and may be applied to provide a gradual transition between shapes with changing depth.

According to other alternatives, other factors such as the size, orientation, and/or positional offset of blur shapes may be varied with changes in depth. For example, a blur shape in the background portion 716 may be applied with a small size at maximum depth; the size of the blur shape may increase as the depth of objects in the image 710 approaches the second focus depth 580.

FIGS. 5A and 5B both represent blurring effects as linear functions of distance from the camera. In some embodiments, nonlinear functions may instead be applied. This concept will be shown and described in connection with FIGS. 31A and 31B.

FIGS. 31A and 31B are graphs 3100, 3150 illustrating linear and nonlinear application of blur effects, respectively, according to exemplary embodiments. Each of the graphs 3100, 3150 may have a horizontal axis 3110 that represents the distance of objects in the image from the camera, and a vertical axis 3120 that represents the blurriness of those objects. Each of the graphs 3100, 3150 may also have a focus range 3160, within which all objects are in focus. The focus range 3160 may extend from a first focus depth 3170 to a second focus depth 3180, like those of FIG. 5B.

In FIG. 31A, linear functions may be used to determine blurriness based on depth differential relative to the first focus depth 3170 and the second focus depth 3180. More particularly, a linear foreground function 3182 may be used to determine blurriness based on the depth differential between an object and the first focus depth 3170. A nonlinear background function 3184 may be used to determine blurriness based on a depth differential between an object and the second focus depth 3180. The linear foreground function 3182 and the nonlinear background function 3184 are, as linear functions, represented by straight lines with constant slopes.

Thus, the transition in application of blurring or other depth-based effects between any two points (for example, a first point 3186 and a second point 3188 on the nonlinear background function 3184) may vary with a linear relationship to depth (distance from the camera). The first point 3186 and the second point 3188 may represent different degrees of blurriness, or in alternative embodiments, different application of depth-based effects such as the use of different sizes or shapes of blur shapes.

In FIG. 31B, nonlinear functions may be used to determine blurriness based on depth differential relative to the first focus depth 3170 and the second focus depth 3180. More particularly, a nonlinear foreground function 3192 may be used to determine blurriness based on the depth differential between an object and the first focus depth 3170.

A nonlinear background function 3194 may be used to determine blurriness based on a depth differential between an object and the second focus depth 3180. The nonlinear foreground function 3192 and the nonlinear background function 3194 are, as nonlinear functions, represented by lines with arbitrary, curvilinear shapes with varied slopes.

Thus, the transition in application of blurring or other depth-based effects between any two points may be variable, depending on the points selected. For example, a first point 3196 and a second point 3198 may represent different degrees of blurriness, or in alternative embodiments, different application of depth-based effects such as the use of different sizes or shapes of blur shapes. The transition in application of such effects between the first point 3196 and the second point 3198 may be variable with depth. As shown, the nonlinear background function 3194 need not continuously rise, but may fall as application of an effect is reversed with increasing depth, for some portion of the function.

In various embodiments, the user may have visibility to and/or control over the functions used to apply depth-based processing. A wide variety of user interfaces may be used to accomplish this. The user may select from a variety of pre-established linear and/or nonlinear functions, or may have the option to customize a function.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:
1. A method for processing an image, the method comprising:
in a data store, receiving the image;
in an input device, receiving a first user input that designates a first focus depth;
in the input device, receiving a second user input that designates a second focus depth different from the first focus depth;
in a processor, identifying one or more foreground portions of the image, wherein the one or more foreground portions have one or more foreground portion depths, each of which is less than the first focus depth;
in the processor, identifying one or more background portions of the image, wherein the one or more background portions have one or more background portion depths, each of which is greater than the second focus depth;
in the processor, applying blurring to the one or more foreground portions and to the one or more background portions to generate a processed image; and
on a display device, displaying the processed image;
wherein applying the blurring to the one or more foreground portions comprises, for each of the one or more foreground portions, applying the blurring in linear proportion to a foreground focus depth difference between the first focus depth and the foreground portion depth associated with the foreground portion;
and wherein applying the blurring to the one or more background portions comprises, for each of the one or more background portions, applying the blurring in linear proportion to a background focus depth difference between the second focus depth and the background portion depth associated with the background portion.

2. The method of claim 1, further comprising, in the data store, receiving a depth map indicative of a plurality of depths at which a plurality of objects were disposed, relative to a camera used to capture the image, during capture of the image;
wherein identifying the one or more foreground portions comprises determining, based on the depth map, that the one or more foreground portions have the one or more foreground portion depths;
and wherein identifying the one or more background portions comprises determining, based on the depth map, that the one or more background portions have the one or more background portion depths.

3. The method of claim 2, wherein the image comprises a light-field image captured with a light-field image capture device.

4. The method of claim 1, further comprising, on the display device:
displaying a graphical user interface comprising a first element and a second element;
in response to receipt of the first user input, displaying motion of the first element to a first location corresponding to the first focus depth; and
in response to receipt of the second user input, displaying motion of the second element to a second location corresponding to the second focus depth.

5. The method of claim 4, wherein displaying the graphical user interface comprises displaying a range bar;
wherein the first element comprises a first slider on the range bar;
wherein the second element comprises a second slider on the range bar;
wherein the input device comprises a pointing device;
wherein receiving the first user input comprises, with the pointing device, detecting motion selecting to move the first slider along the range bar to the first location;

and wherein receiving the second user input comprises, with the pointing device, detecting motion selecting to move the second slider along the range bar to the second location.

6. The method of claim 1, wherein the first focus depth is less than the second focus depth such that one or more intermediate portions of the image have one or more intermediate portion depths that are greater than the first focus depth and less than the second focus depth;
and wherein generating the processed image comprises rendering the one or more intermediate portions of the image without blurring.

7. The method of claim 1, wherein the first focus depth is greater than the second focus depth such one or more of the one or more foreground portions of the image are also included in the one or more background portions of the image;
and wherein generating the processed image comprises applying blurring to an entirety of the image.

8. The method of claim 1, wherein applying the blurring to the one or more foreground portions and to the one or more background portions comprises applying a noncircular blur shape to the one or more foreground portions and to the one or more background portions.

9. The method of claim 1, wherein applying the blurring to the one or more foreground portions and to the one or more background portions comprises:
applying a first noncircular blur shape to one or more first subsets of the one or more foreground portions and the one or more background portions that are at a first depth; and
applying a second noncircular blur shape to one or more second subsets of the one or more foreground portions and the one or more background portions that are at a second depth different from the first depth.

10. The method of claim 1, wherein applying the blurring to the one or more foreground portions and to the one or more background portions comprises applying the blurring to each pixel of a plurality of pixels of the image based, at least partially, on at least one of an X coordinate of the pixel, and a Y coordinate of the pixel.

11. The method of claim 10, further comprising, in the input device, prior to applying the blurring to the one or more foreground portions and to the one or more background portions, receiving a third user input that designates a tilt angle at which a focus plane of the image is to be tilted;
wherein applying the blurring to the one or more foreground portions and to the one or more background portions further comprises applying the blurring to portions of the image that are displaced from the focus plane.

12. The method of claim 11, further comprising, in the input device, prior to applying the blurring to the one or more foreground portions and to the one or more background portions, receiving a fourth user input that designates a rotation angle at which the focus plane is to be rotated.

13. A method for processing an image, the method comprising:
in a data store, receiving the image;
in an input device, receiving a first user input that designates a first focus depth;
in the input device, receiving a second user input that designates a second focus depth different from the first focus depth;
in a processor, identifying one or more foreground portions of the image, wherein the one or more foreground portions have one or more foreground portion depths, each of which is less than the first focus depth;
in the processor, identifying one or more background portions of the image, wherein the one or more background portions have one or more background portion depths, each of which is greater than the second focus depth;
in the processor, applying blurring to the one or more foreground portions and to the one or more background portions to generate a processed image; and
on a display device, displaying the processed image;
wherein applying the blurring to the one or more foreground portions comprises, for each of the one or more foreground portions, applying the blurring as a nonlinear function of a foreground focus depth difference between the first focus depth and the foreground portion depth associated with the foreground portion;
and wherein applying the blurring to the one or more background portions comprises, for each of the one or more background portions, applying the blurring as a nonlinear function of a background focus depth difference between the second focus depth and the background portion depth associated with the background portion.

14. The method of claim 13, further comprising, in the data store, receiving a depth map indicative of a plurality of depths at which a plurality of objects were disposed, relative to a camera used to capture the image, during capture of the image;
wherein identifying the one or more foreground portions comprises determining, based on the depth map, that the one or more foreground portions have the one or more foreground portion depths;
and wherein identifying the one or more background portions comprises determining, based on the depth map, that the one or more background portions have the one or more background portion depths.

15. The method of claim 14, wherein the image comprises a light-field image captured with a light-field image capture device.

16. The method of claim 13, further comprising, on the display device:
displaying a graphical user interface comprising a first element and a second element;
in response to receipt of the first user input, displaying motion of the first element to a first location corresponding to the first focus depth; and
in response to receipt of the second user input, displaying motion of the second element to a second location corresponding to the second focus depth.

17. The method of claim 16, wherein displaying the graphical user interface comprises displaying a range bar;
wherein the first element comprises a first slider on the range bar;
wherein the second element comprises a second slider on the range bar;
wherein the input device comprises a pointing device;
wherein receiving the first user input comprises, with the pointing device, detecting motion selecting to move the first slider along the range bar to the first location;
and wherein receiving the second user input comprises, with the pointing device, detecting motion selecting to move the second slider along the range bar to the second location.

18. The method of claim 13, wherein the first focus depth is less than the second focus depth such that one or more intermediate portions of the image have one or more intermediate portion depths that are greater than the first focus depth and less than the second focus depth;

and wherein generating the processed image comprises rendering the one or more intermediate portions of the image without blurring.

19. The method of claim 13, wherein the first focus depth is greater than the second focus depth such one or more of the one or more foreground portions of the image are also included in the one or more background portions of the image;

and wherein generating the processed image comprises applying blurring to an entirety of the image.

20. The method of claim 13, wherein applying the blurring to the one or more foreground portions and to the one or more background portions comprises applying a noncircular blur shape to the one or more foreground portions and to the one or more background portions.

21. The method of claim 13, wherein applying the blurring to the one or more foreground portions and to the one or more background portions comprises:

applying a first noncircular blur shape to one or more first subsets of the one or more foreground portions and the one or more background portions that are at a first depth; and applying a second noncircular blur shape to one or more second subsets of the one or more foreground portions and the one or more background portions that are at a second depth different from the first depth.

22. The method of claim 13, wherein applying the blurring to the one or more foreground portions and to the one or more background portions comprises applying the blurring to each pixel of a plurality of pixels of the image based, at least partially, on at least one of an X coordinate of the pixel, and a Y coordinate of the pixel.

23. The method of claim 22, further comprising, in the input device, prior to applying the blurring to the one or more foreground portions and to the one or more background portions, receiving a third user input that designates a tilt angle at which a focus plane of the image is to be tilted;

wherein applying the blurring to the one or more foreground portions and to the one or more background portions further comprises applying the blurring to portions of the image that are displaced from the focus plane.

24. The method of claim 23, further comprising, in the input device, prior to applying the blurring to the one or more foreground portions and to the one or more background portions, receiving a fourth user input that designates a rotation angle at which the focus plane is to be rotated.

25. A non-transitory computer-readable medium for processing an image, comprising instructions stored thereon, that when executed by a processor, perform the steps of:

causing a data store to receive the image;

causing an input device to receive a first user input that designates a first focus depth;

causing the input device to receive a second user input that designates a second focus depth different from the first focus depth;

identifying one or more foreground portions of the image, wherein the one or more foreground portions have one or more foreground portion depths, each of which is less than the first focus depth;

identifying one or more background portions of the image, wherein the one or more background portions have one or more background portion depths, each of which is greater than the second focus depth;

applying blurring to the one or more foreground portions and to the one or more background portions to generate a processed image; and causing a display device to display the processed image;

wherein applying the blurring to the one or more foreground portions comprises, for each of the one or more foreground portions, applying the blurring in linear proportion to a foreground focus depth difference between the first focus depth and the foreground portion depth associated with the foreground portion;

and wherein applying the blurring to the one or more background portions comprises, for each of the one or more background portions, applying the blurring in linear proportion to a background focus depth difference between the second focus depth and the background portion depth associated with the background portion.

26. The non-transitory computer-readable medium of claim 25, further comprising instructions stored thereon, that when executed by a processor, cause the data store to receive a depth map indicative of a plurality of depths at which a plurality of objects were disposed, relative to a camera used to capture the image, during capture of the image;

wherein identifying the one or more foreground portions comprises determining, based on the depth map, that the one or more foreground portions have the one or more foreground portion depths;

and wherein identifying the one or more background portions comprises determining, based on the depth map, that the one or more background portions have the one or more background portion depths.

27. The non-transitory computer-readable medium of claim 25, further comprising instructions stored thereon, that when executed by a processor, perform the steps of:

causing the display device to display a range bar comprising a first slider on the range bar and a second slider on the range bar;

causing the display device, in response to receipt of the first user input, to display motion of the first slider to a first location corresponding to the first focus depth; and causing the display device, in response to receipt of the second user input, to display motion of the second slider to a second location corresponding to the second focus depth;

wherein the input device comprises a pointing device;

wherein receiving the first user input comprises, with the pointing device, detecting motion selecting to move the first slider along the range bar to the first location;

and wherein receiving the second user input comprises, with the pointing device, detecting motion selecting to move the second slider along the range bar to the second location.

28. The non-transitory computer-readable medium of claim 25, wherein the first focus depth is less than the second focus depth such that one or more intermediate portions of the image have one or more intermediate portion depths that are greater than the first focus depth and less than the second focus depth;

and wherein generating the processed image comprises rendering the one or more intermediate portions of the image without blurring.

29. The non-transitory computer-readable medium of claim 25, wherein applying the blurring to the one or more foreground portions and to the one or more background portions comprises applying the blurring to each pixel of a plurality of pixels of the image based, at least partially, on at least one of an X coordinate of the pixel, and a Y coordinate of the pixel.

30. The non-transitory computer-readable medium of claim 29, further comprising instructions stored thereon, that when executed by a processor, cause the input device, prior to applying the blurring to the one or more foreground portions and to the one or more background portions, to receive a third user input that designates a tilt angle at which a focus plane of the image is to be tilted;
wherein applying the blurring to the one or more foreground portions and to the one or more background portions further comprises applying the blurring to portions of the image that are displaced from the focus plane.

31. A system for processing an image, the system comprising:
a data store configured to receive the image;
an input device configured to:
receive a first user input that designates a first focus depth; and
receive a second user input that designates a second focus depth different from the first focus depth;
a processor, communicatively coupled to the data store and the input device, configured to:
identify one or more foreground portions of the image, wherein the one or more foreground portions have one or more foreground portion depths, each of which is less than the first focus depth;
identify one or more background portions of the image, wherein the one or more background portions have one or more background portion depths, each of which is greater than the second focus depth; and
apply blurring to the one or more foreground portions and to the one or more background portions to generate a processed image; and
a display device, communicatively coupled to the processor, configured to display the processed image;
wherein the processor is configured to apply the blurring to the one or more foreground portions by, for each of the one or more foreground portions, applying the blurring in linear proportion to a foreground focus depth difference between the first focus depth and the foreground portion depth associated with the foreground portion;
and wherein the processor is configured to apply the blurring to the one or more background portions by, for each of the one or more background portions, applying the blurring in linear proportion to a background focus depth difference between the second focus depth and the background portion depth associated with the background portion.

32. The system of claim 31, wherein the data store is further configured to receive a depth map indicative of a plurality of depths at which a plurality of objects were disposed, relative to a camera used to capture the image, during capture of the image;
wherein the processor is further configured to identify the one or more foreground portions by determining, based on the depth map, that the one or more foreground portions have the one or more foreground portion depths;
and wherein the processor is further configured to identify the one or more background portions by determining, based on the depth map, that the one or more background portions have the one or more background portion depths.

33. The system of claim 31, wherein the display device is further configured to:
display a range bar comprising a first slider on the range bar and a second slider on the range bar;
in response to receipt of the first user input, display motion of the first slider to a first location corresponding to the first focus depth; and
in response to receipt of the second user input, display motion of the second slider to a second location corresponding to the second focus depth;
wherein the input device comprises a pointing device;
wherein the input device is further configured to receive the first user input by, with the pointing device, detecting motion selecting to move the first slider along the range bar to the first location;
and wherein the input device is further configured to receive the second user input by, with the pointing device, detecting motion selecting to move the second slider along the range bar to the second location.

34. The system of claim 31, wherein the first focus depth is less than the second focus depth such that one or more intermediate portions of the image have one or more intermediate portion depths that are greater than the first focus depth and less than the second focus depth;
and wherein the processor is further configured to generate the processed image by rendering the one or more intermediate portions of the image without blurring.

35. The system of claim 31, wherein the processor is further configured to apply the blurring to the one or more foreground portions and to the one or more background portions by applying the blurring to each pixel of a plurality of pixels of the image based, at least partially, on at least one of an X coordinate of the pixel, and a Y coordinate of the pixel.

36. The system of claim 35, wherein the input device is further configured, prior to application of the blurring to the one or more foreground portions and to the one or more background portions, to receive a third user input that designates a tilt angle at which a focus plane of the image is to be tilted;
wherein the processor is further configured to apply the blurring to the one or more foreground portions and to the one or more background portions by applying the blurring to portions of the image that are displaced from the focus plane.

37. A non-transitory computer-readable medium for processing an image, comprising instructions stored thereon, that when executed by a processor, perform the steps of:
causing a data store to receive the image;
causing an input device to receive a first user input that designates a first focus depth;
causing the input device to receive a second user input that designates a second focus depth different from the first focus depth;
identifying one or more foreground portions of the image, wherein the one or more foreground portions have one or more foreground portion depths, each of which is less than the first focus depth;
identifying one or more background portions of the image, wherein the one or more background portions have one or more background portion depths, each of which is greater than the second focus depth;

applying blurring to the one or more foreground portions and to the one or more background portions to generate a processed image; and causing a display device to display the processed image;

wherein applying the blurring to the one or more foreground portions comprises, for each of the one or more foreground portions, applying the blurring as a nonlinear function of a foreground focus depth difference between the first focus depth and the foreground portion depth associated with the foreground portion;

and wherein applying the blurring to the one or more background portions comprises, for each of the one or more background portions, applying the blurring as a nonlinear function of a background focus depth difference between the second focus depth and the background portion depth associated with the background portion.

38. The non-transitory computer-readable medium of claim 37, further comprising instructions stored thereon, that when executed by a processor, cause the data store to receive a depth map indicative of a plurality of depths at which a plurality of objects were disposed, relative to a camera used to capture the image, during capture of the image;

wherein identifying the one or more foreground portions comprises determining, based on the depth map, that the one or more foreground portions have the one or more foreground portion depths;

and wherein identifying the one or more background portions comprises determining, based on the depth map, that the one or more background portions have the one or more background portion depths.

39. The non-transitory computer-readable medium of claim 37, further comprising instructions stored thereon, that when executed by a processor, perform the steps of:

causing the display device to display a range bar comprising a first slider on the range bar and a second slider on the range bar;

causing the display device, in response to receipt of the first user input, to display motion of the first slider to a first location corresponding to the first focus depth; and causing the display device, in response to receipt of the second user input, to display motion of the second slider to a second location corresponding to the second focus depth;

wherein the input device comprises a pointing device;

wherein receiving the first user input comprises, with the pointing device, detecting motion selecting to move the first slider along the range bar to the first location;

and wherein receiving the second user input comprises, with the pointing device, detecting motion selecting to move the second slider along the range bar to the second location.

40. The non-transitory computer-readable medium of claim 37, wherein the first focus depth is less than the second focus depth such that one or more intermediate portions of the image have one or more intermediate portion depths that are greater than the first focus depth and less than the second focus depth;

and wherein generating the processed image comprises rendering the one or more intermediate portions of the image without blurring.

41. The non-transitory computer-readable medium of claim 37, wherein applying the blurring to the one or more foreground portions and to the one or more background portions comprises applying the blurring to each pixel of a plurality of pixels of the image based, at least partially, on at least one of an X coordinate of the pixel, and a Y coordinate of the pixel.

42. The non-transitory computer-readable medium of claim 41, further comprising instructions stored thereon, that when executed by a processor, cause the input device, prior to applying the blurring to the one or more foreground portions and to the one or more background portions, to receive a third user input that designates a tilt angle at which a focus plane of the image is to be tilted;

wherein applying the blurring to the one or more foreground portions and to the one or more background portions further comprises applying the blurring to portions of the image that are displaced from the focus plane.

43. A system for processing an image, the system comprising:

a data store configured to receive the image;

an input device configured to:
receive a first user input that designates a first focus depth; and
receive a second user input that designates a second focus depth different from the first focus depth;

a processor, communicatively coupled to the data store and the input device, configured to:
identify one or more foreground portions of the image, wherein the one or more foreground portions have one or more foreground portion depths, each of which is less than the first focus depth;
identify one or more background portions of the image, wherein the one or more background portions have one or more background portion depths, each of which is greater than the second focus depth; and
apply blurring to the one or more foreground portions and to the one or more background portions to generate a processed image; and a display device, communicatively coupled to the processor, configured to display the processed image;

wherein the processor is configured to apply the blurring to the one or more foreground portions by, for each of the one or more foreground portions, applying the blurring as a nonlinear function of a foreground focus depth difference between the first focus depth and the foreground portion depth associated with the foreground portion;

and wherein the processor is configured to apply the blurring to the one or more background portions by, for each of the one or more background portions, applying the blurring as a nonlinear function of a background focus depth difference between the second focus depth and the background portion depth associated with the background portion.

44. The system of claim 43, wherein the data store is further configured to receive a depth map indicative of a plurality of depths at which a plurality of objects were disposed, relative to a camera used to capture the image, during capture of the image;

wherein the processor is further configured to identify the one or more foreground portions by determining, based on the depth map, that the one or more foreground portions have the one or more foreground portion depths;

and wherein the processor is further configured to identify the one or more background portions by determining, based on the depth map, that the one or more background portions have the one or more background portion depths.

45. The system of claim 43, wherein the display device is further configured to:
- display a range bar comprising a first slider on the range bar and a second slider on the range bar;
- in response to receipt of the first user input, display motion of the first slider to a first location corresponding to the first focus depth; and
- in response to receipt of the second user input, display motion of the second slider to a second location corresponding to the second focus depth;
- wherein the input device comprises a pointing device;
- wherein the input device is further configured to receive the first user input by, with the pointing device, detecting motion selecting to move the first slider along the range bar to the first location;
- and wherein the input device is further configured to receive the second user input by, with the pointing device, detecting motion selecting to move the second slider along the range bar to the second location.

46. The system of claim 43, wherein the first focus depth is less than the second focus depth such that one or more intermediate portions of the image have one or more intermediate portion depths that are greater than the first focus depth and less than the second focus depth; and wherein the processor is further configured to generate the processed image by rendering the one or more intermediate portions of the image without blurring.

47. The system of claim 43, wherein the processor is further configured to apply the blurring to the one or more foreground portions and to the one or more background portions by applying the blurring to each pixel of a plurality of pixels of the image based, at least partially, on at least one of an X coordinate of the pixel, and a Y coordinate of the pixel.

48. The system of claim 47, wherein the input device is further configured, prior to application of the blurring to the one or more foreground portions and to the one or more background portions, to receive a third user input that designates a tilt angle at which a focus plane of the image is to be tilted;
- wherein the processor is further configured to apply the blurring to the one or more foreground portions and to the one or more background portions by applying the blurring to portions of the image that are displaced from the focus plane.

* * * * *